US010642236B2

United States Patent
Ohama et al.

(10) Patent No.: US 10,642,236 B2
(45) Date of Patent: May 5, 2020

(54) ELECTRIC POWER DEMAND ADJUSTMENT PROGRAM MANAGEMENT APPARATUS AND ELECTRIC POWER DEMAND ADJUSTMENT PROGRAM MANAGEMENT METHOD

(71) Applicant: HITACHI, LTD., Tokyo (JP)

(72) Inventors: Nobuyuki Ohama, Tokyo (JP); Masao Tsuyuzaki, Tokyo (JP); Itsuya Nishikawa, Tokyo (JP); Masato Utsumi, Tokyo (JP); Syuuichi Yoshida, Tokyo (JP); Yasuhiro Kawai, Tokyo (JP); Jyunpei Ogawa, Tokyo (JP); Shingo Izumi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 124 days.

(21) Appl. No.: 15/075,607

(22) Filed: Mar. 21, 2016

(65) Prior Publication Data

US 2017/0097622 A1    Apr. 6, 2017

(30) Foreign Application Priority Data

Oct. 1, 2015    (JP) ................................ 2015-195532

(51) Int. Cl.
*H02J 3/12* (2006.01)
*G06Q 50/06* (2012.01)
(Continued)

(52) U.S. Cl.
CPC .......... *G05B 19/042* (2013.01); *G06Q 10/06* (2013.01); *G06Q 50/06* (2013.01); *H02J 3/00* (2013.01);
(Continued)

(58) Field of Classification Search
CPC .......... G05B 19/042; G05B 2219/2639; G06Q 50/06; H02J 3/00; H02J 3/14;
(Continued)

(56) References Cited

U.S. PATENT DOCUMENTS

| 4,324,987 A | * | 4/1982 | Sullivan, II | ............... | H02J 3/14 |
| | | | | | 307/35 |
| 8,676,394 B2 | | 3/2014 | Lo et al. | | |

(Continued)

FOREIGN PATENT DOCUMENTS

| EP | 2 408 082 A1 | 1/2012 |
| EP | 2 456 043 A1 | 5/2012 |

(Continued)

OTHER PUBLICATIONS

Spanish Search Report for Application No. 201630290 dated May 29, 2017.

(Continued)

*Primary Examiner* — Jennifer L Norton
(74) *Attorney, Agent, or Firm* — Volpe and Koenig, P.C.

(57) ABSTRACT

An electric power demand adjustment program management apparatus, comprises a server which includes: a communication unit that communicates with a plurality of customer terminals in each predetermined time segment, based on predetermined constraint conditions and predetermined information received from the plurality of customer terminals; a program executing unit that transmits the electric power demand adjustment program, and instructs the first customer terminal to execute the electric power demand adjustment pro- (Continued)

gram; and a providing unit that provides, when the program unit fails to create the electric power demand adjustment program, investigation result information including an investigation result for a cause of the failure.

14 Claims, 27 Drawing Sheets

(51) Int. Cl.
*G05B 19/042* (2006.01)
*H02J 3/14* (2006.01)
*H02J 3/00* (2006.01)
*G06Q 10/06* (2012.01)
*H02J 3/28* (2006.01)

(52) U.S. Cl.
CPC ...... *H02J 3/12* (2013.01); *H02J 3/14* (2013.01); *G05B 2219/2639* (2013.01); *H02J 3/003* (2020.01); *H02J 3/28* (2013.01); *H02J 2203/20* (2020.01); *Y02B 70/3225* (2013.01); *Y02E 40/76* (2013.01); *Y02E 60/76* (2013.01); *Y04S 10/545* (2013.01); *Y04S 20/222* (2013.01); *Y04S 40/22* (2013.01)

(58) Field of Classification Search
CPC .......... H02J 2003/003; H02J 2003/007; Y02B 70/3225; Y02E 40/76; Y02E 60/76; Y04S 10/54; Y04S 10/545; Y04S 20/222; Y04S 40/22
See application file for complete search history.

(56) References Cited

U.S. PATENT DOCUMENTS

| | | | |
|---|---|---|---|
| 8,825,215 B2 | 9/2014 | Boot | |
| 2003/0036822 A1 | 2/2003 | Davis et al. | |
| 2011/0125542 A1* | 5/2011 | Koch | G06Q 10/063116 705/7.16 |
| 2011/0258018 A1* | 10/2011 | Tyagi | G06Q 30/02 705/7.33 |
| 2012/0271473 A1* | 10/2012 | Koch | G06O 30/0206 700/295 |
| 2012/0326505 A1 | 12/2012 | Otsuki et al. | |
| 2013/0066476 A1* | 3/2013 | Tyagi | H02J 3/008 700/291 |
| 2013/0214598 A1* | 8/2013 | Burke | G05B 15/02 307/31 |
| 2014/0095410 A1* | 4/2014 | Chen | G06Q 10/04 705/412 |
| 2014/0214227 A1* | 7/2014 | Thornton | H02J 4/00 700/295 |
| 2014/0257586 A1* | 9/2014 | Pai | G05B 15/02 700/291 |
| 2014/0324240 A1* | 10/2014 | Thottan | G01D 4/00 700/291 |
| 2015/0019037 A1* | 1/2015 | Koch | G06F 1/26 700/295 |
| 2015/0058270 A1 | 2/2015 | Kawata et al. | |
| 2015/0170171 A1* | 6/2015 | McCurnin | G06Q 30/0202 705/7.31 |
| 2015/0234407 A1 | 8/2015 | Makino | |
| 2016/0013645 A1* | 1/2016 | Matsuda | G06Q 10/06 700/287 |
| 2016/0062328 A1* | 3/2016 | Hashimoto | H04Q 9/00 700/275 |
| 2016/0086199 A1* | 3/2016 | Edmonds | G06Q 10/04 705/7.31 |
| 2016/0118790 A1* | 4/2016 | Imhof | G05B 15/02 700/275 |
| 2019/0190269 A1* | 6/2019 | de Hoog | H02J 3/32 |
| 2019/0346871 A1* | 11/2019 | Lavrisiuk | G05B 19/048 |

FOREIGN PATENT DOCUMENTS

| | | |
|---|---|---|
| EP | 2 708 403 A2 | 3/2014 |
| EP | 2797206 A1 | 10/2014 |
| JP | 2000-032658 A | 1/2000 |
| JP | 2013-009565 A | 1/2013 |
| JP | 2015-062102 A | 4/2015 |
| JP | 2015-154590 A | 8/2015 |
| WO | 2012/060494 A1 | 5/2012 |
| WO | 2012/060495 A1 | 5/2012 |

OTHER PUBLICATIONS

UK Search Report dated Sep. 16, 2016: Application No. GB1604669.0.

Examination Report under Section 18(3) issued by the Intellectual Property Office (United Kingdom) dated Nov. 6, 2018 for Application No. GB1604669.0.

"OpenADR Alliance Releases 2.0b Profile Specification for Full Featured Demand Response Programs", published by OpenADR Alliance, Jul. 2013, URL=http://www.openadr.org/index.php?option=com_content&view=article&id=84: openadr-alliance-releases-2-0b-profile-specification&catid=21:press-releases&Itemid=121.

"Demand and response interface specification version 1.0 (Draft)", published by JSCA, May 2013, URL=http://www.meti.go.jp/press/2013/05/20130515004/20130515004-7.pdf.

Examination Report under Section 18(3) dated Jul. 8, 2019 for GB Patent Application No. GB1604669.0.

Japanese Office Action dated Jul. 2, 2019 for the Japanese Patent Application No. 2015-195532.

Japanese Office Action dated Nov. 19, 2019 for the Japanese Patent Application No. 2015-195532.

* cited by examiner

[FIG. 1]
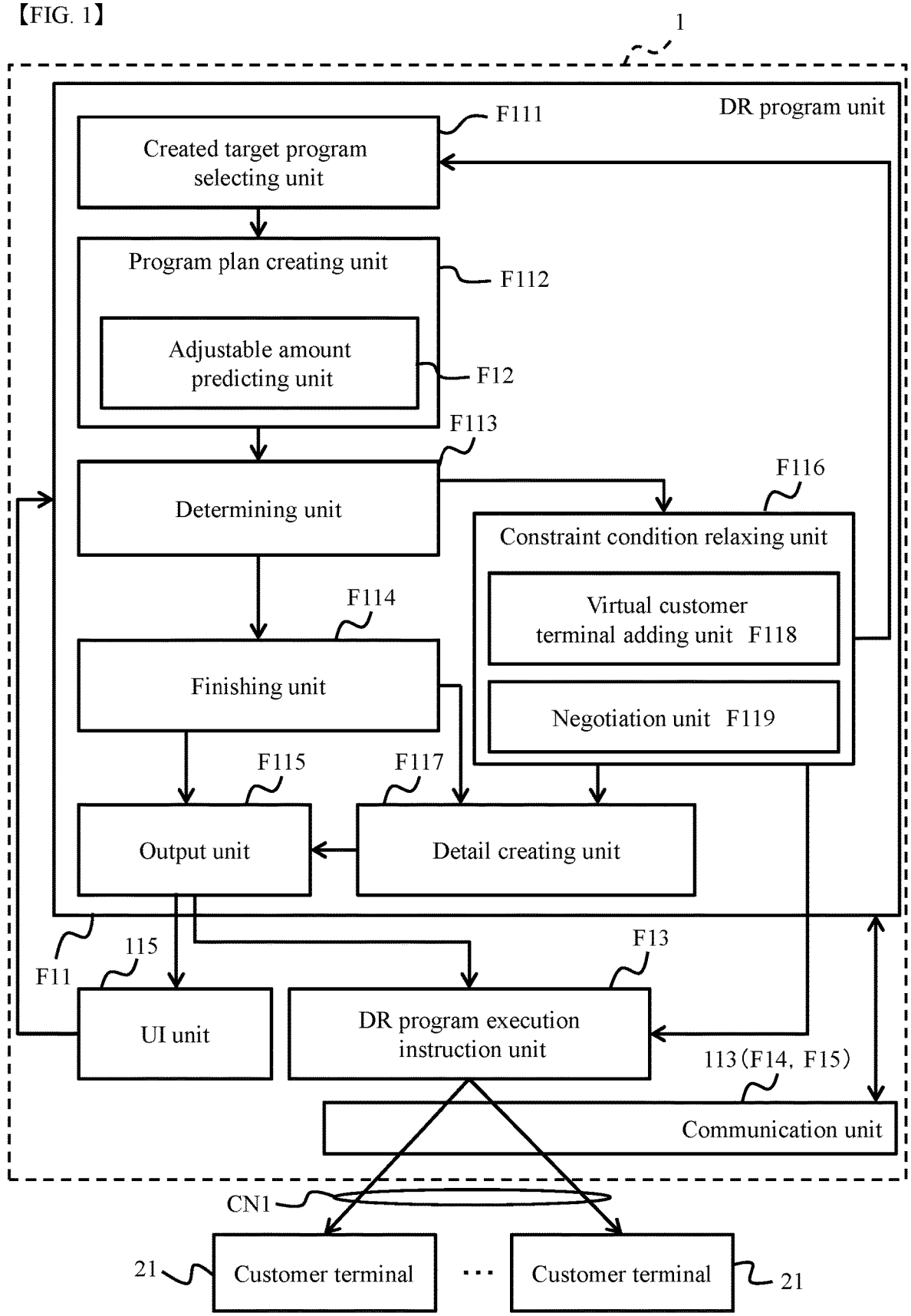

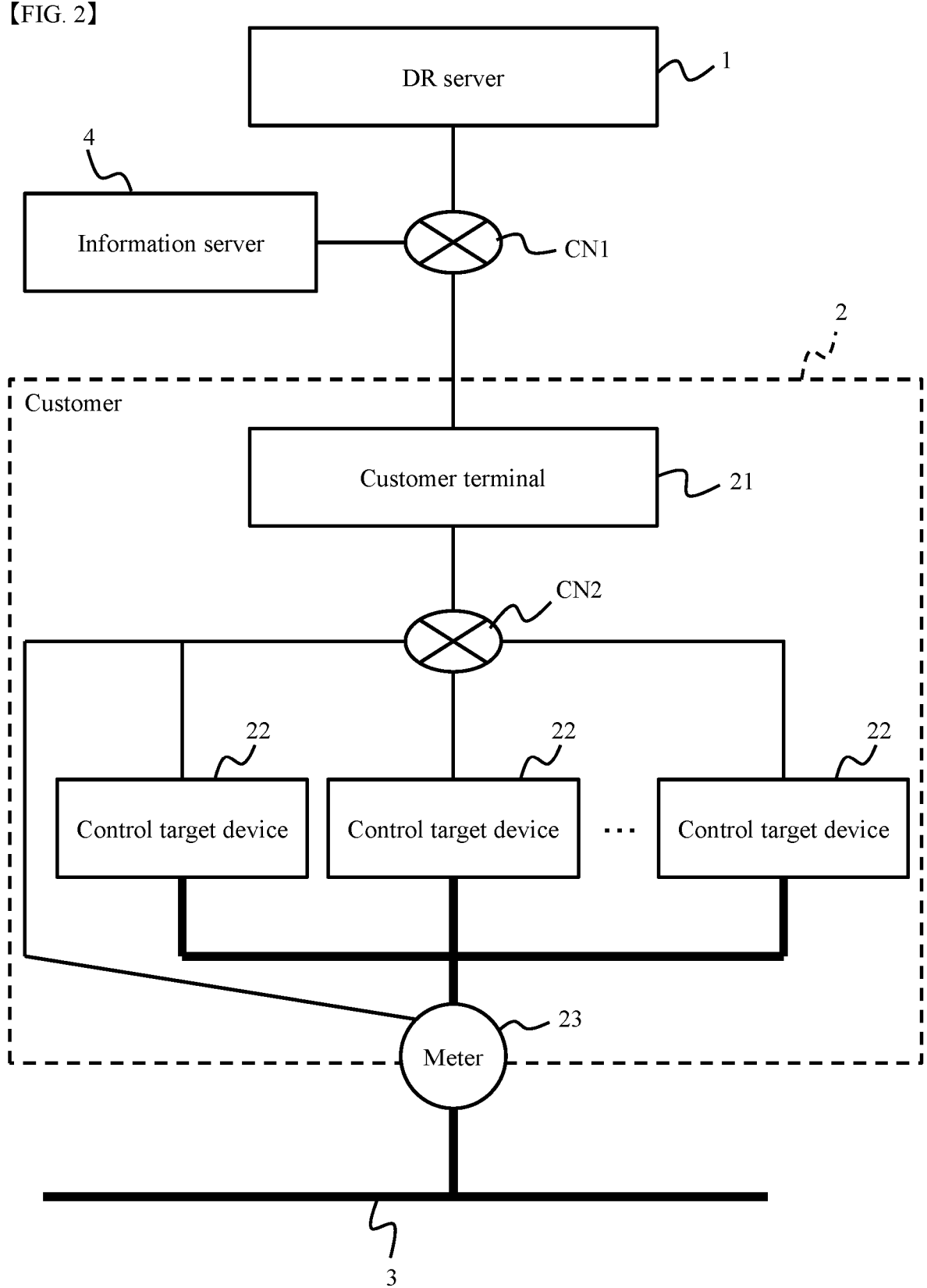
[FIG. 2]

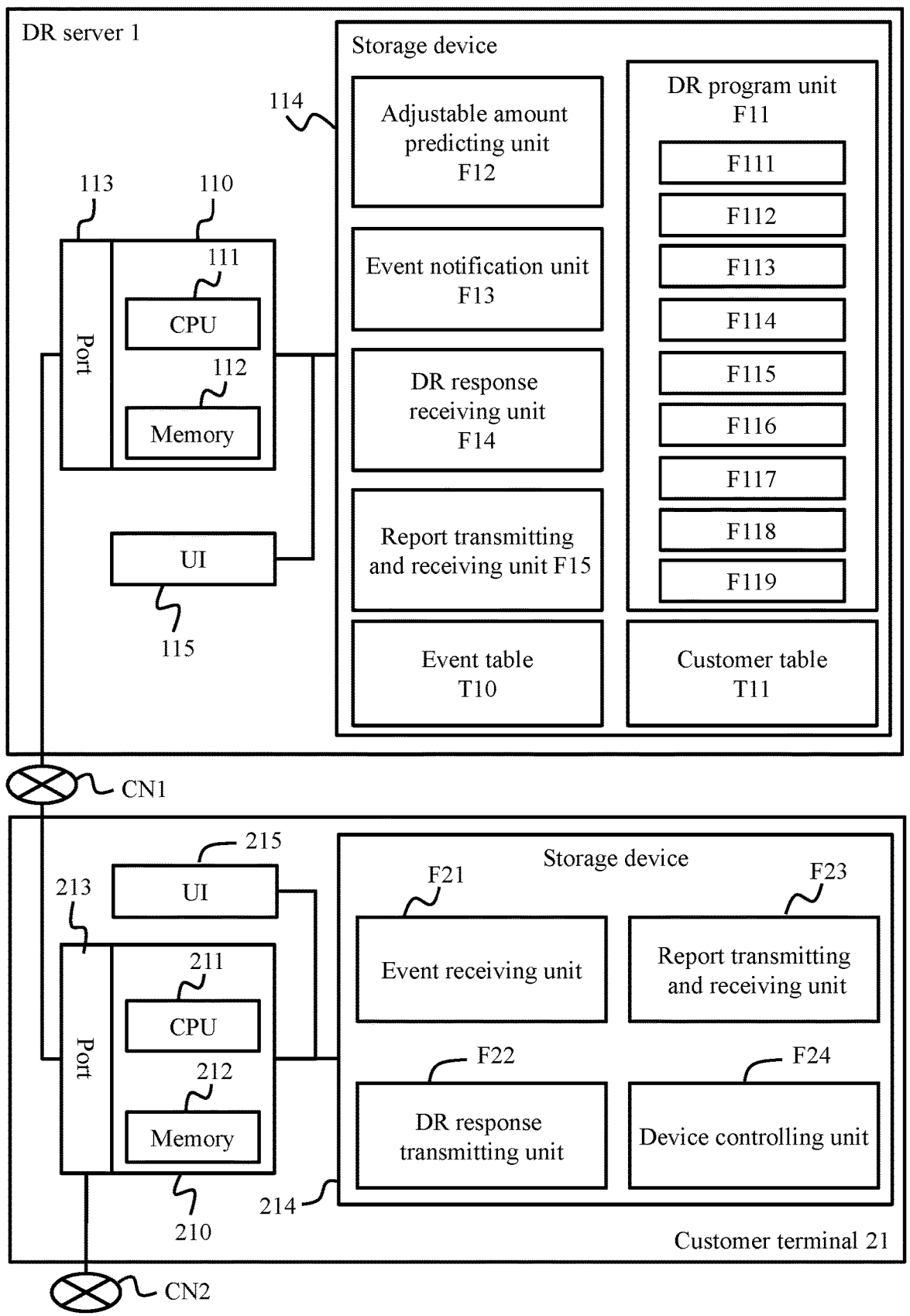

[FIG. 4]
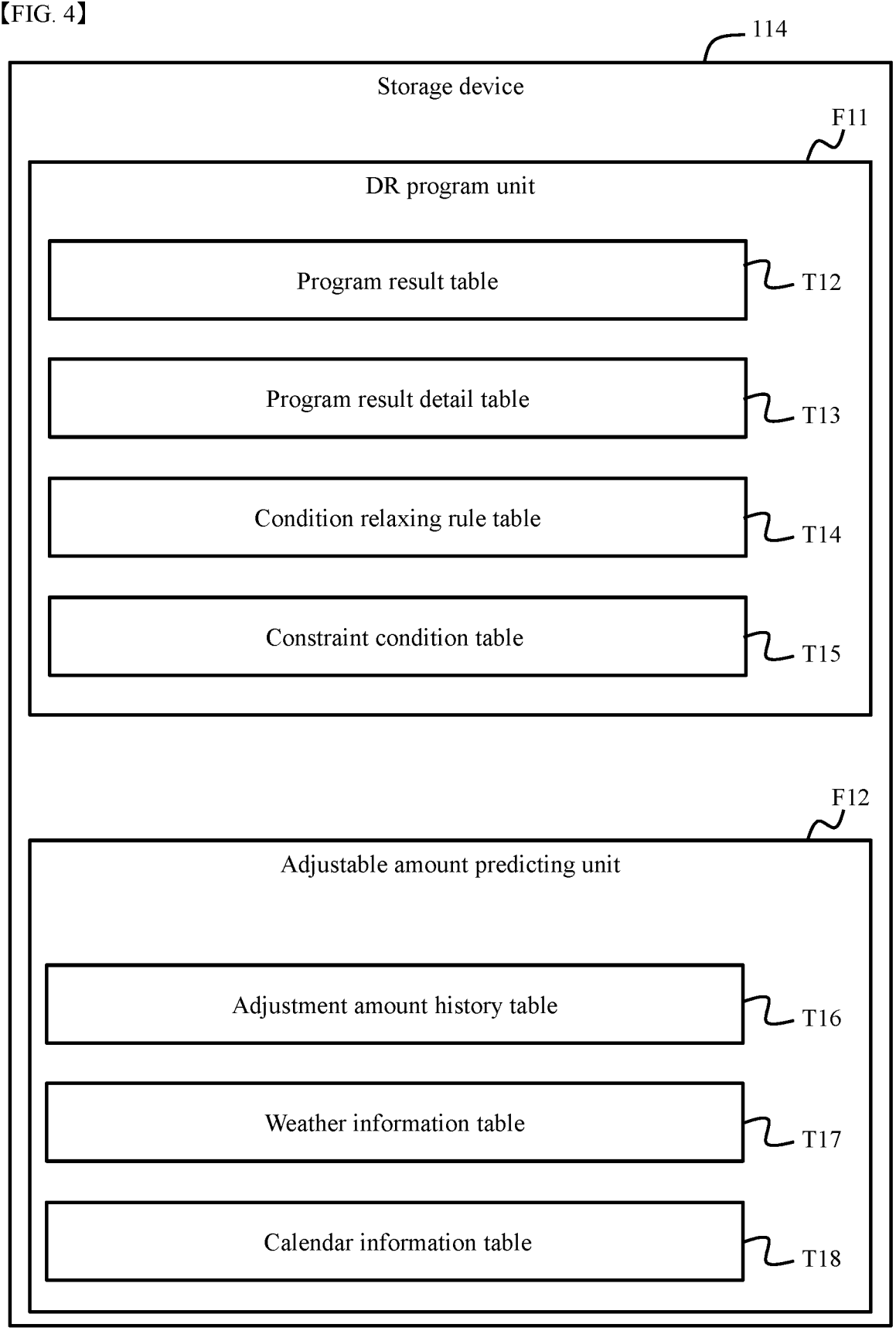

【FIG. 5】

| Customer table T11 (1) | | | |
|---|---|---|---|
| Customer terminal ID | CSTMR1 | CSTMR2 | CSTMR3 |
| Customer terminal address | 1XY.123.123.121 | 1XY.123.123.122 | 1XY.123.123.123 |

C110 — (Customer terminal ID row)
C111 — (Customer terminal address row)

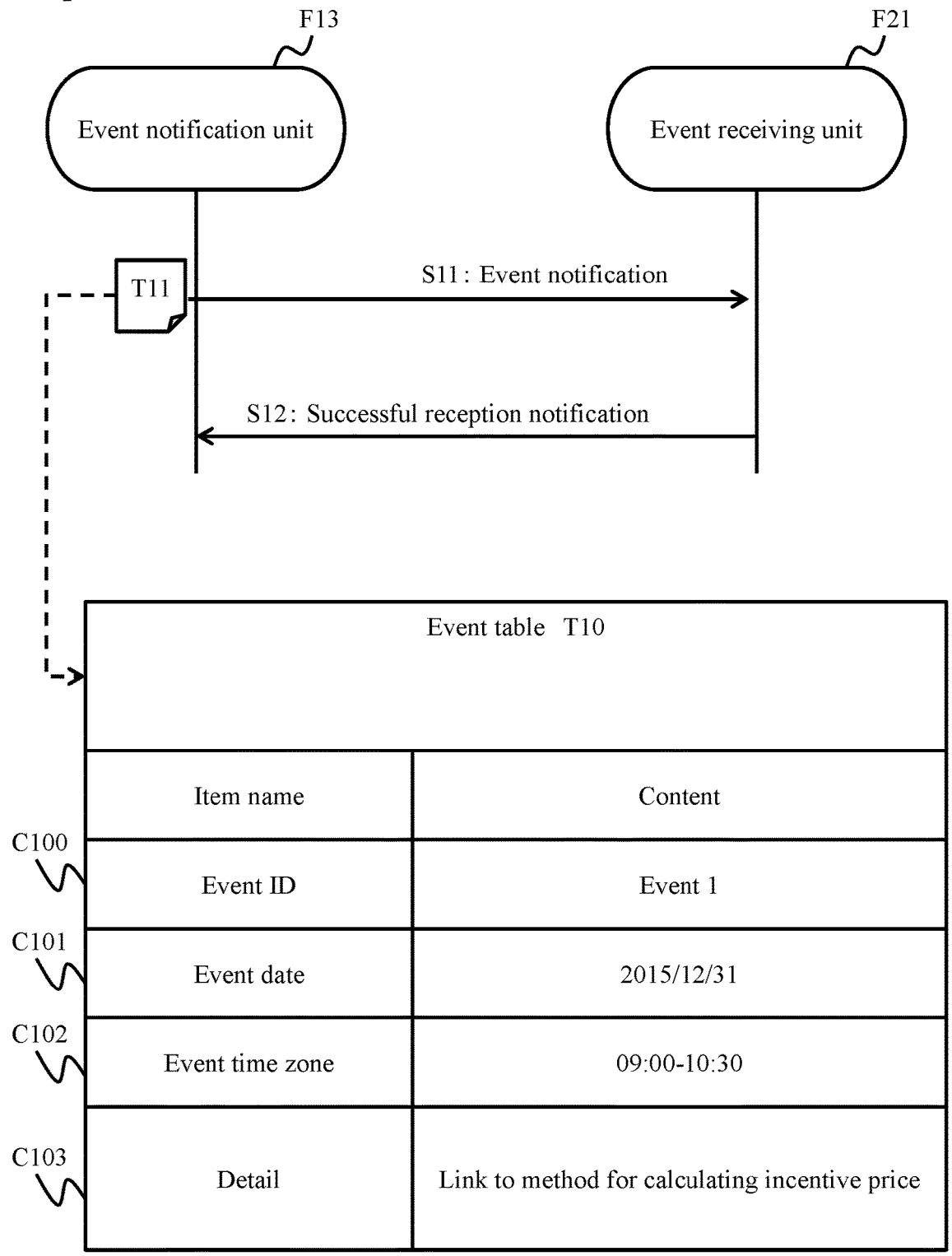
[FIG. 6]

[FIG. 7]
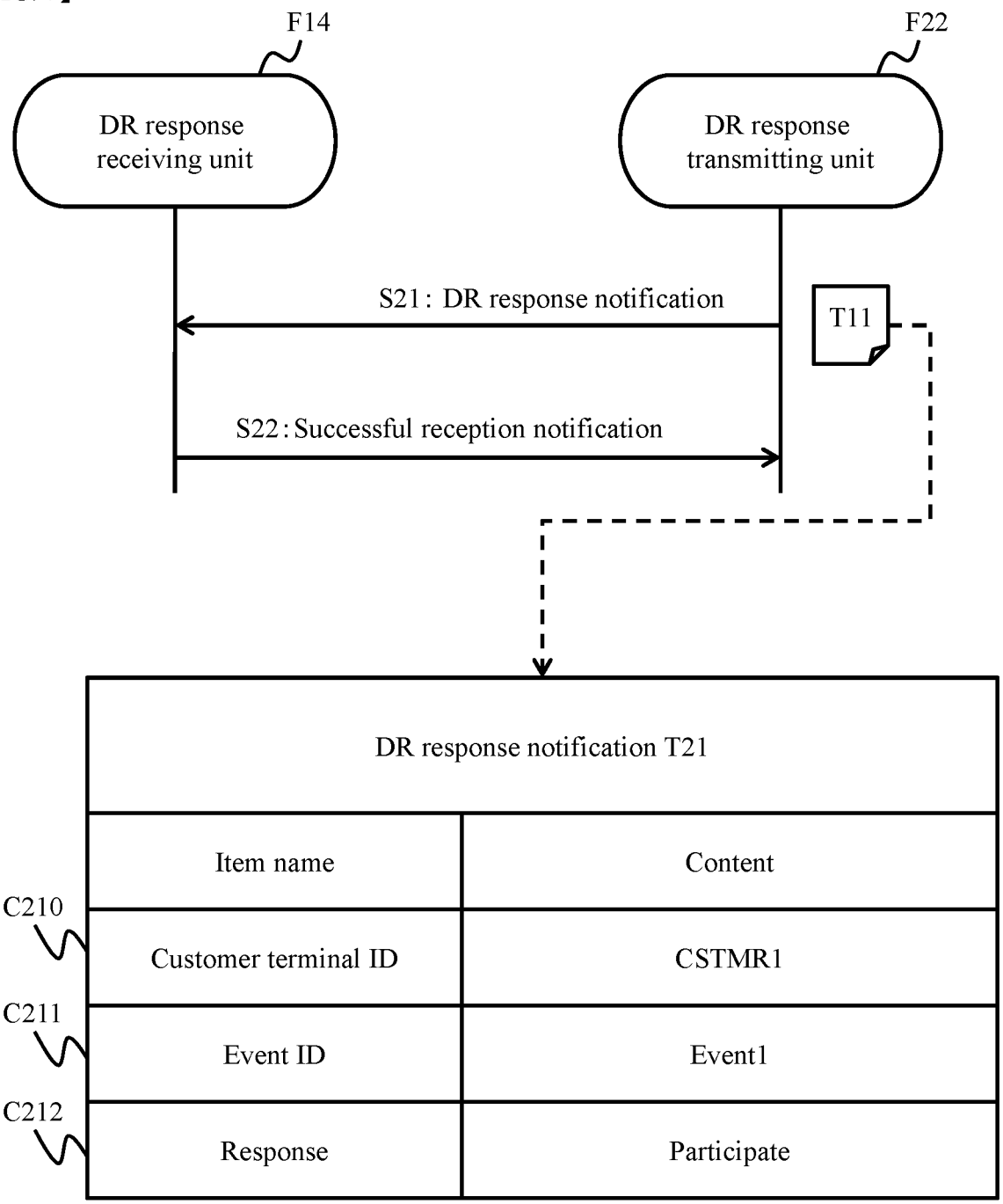

[FIG. 8]
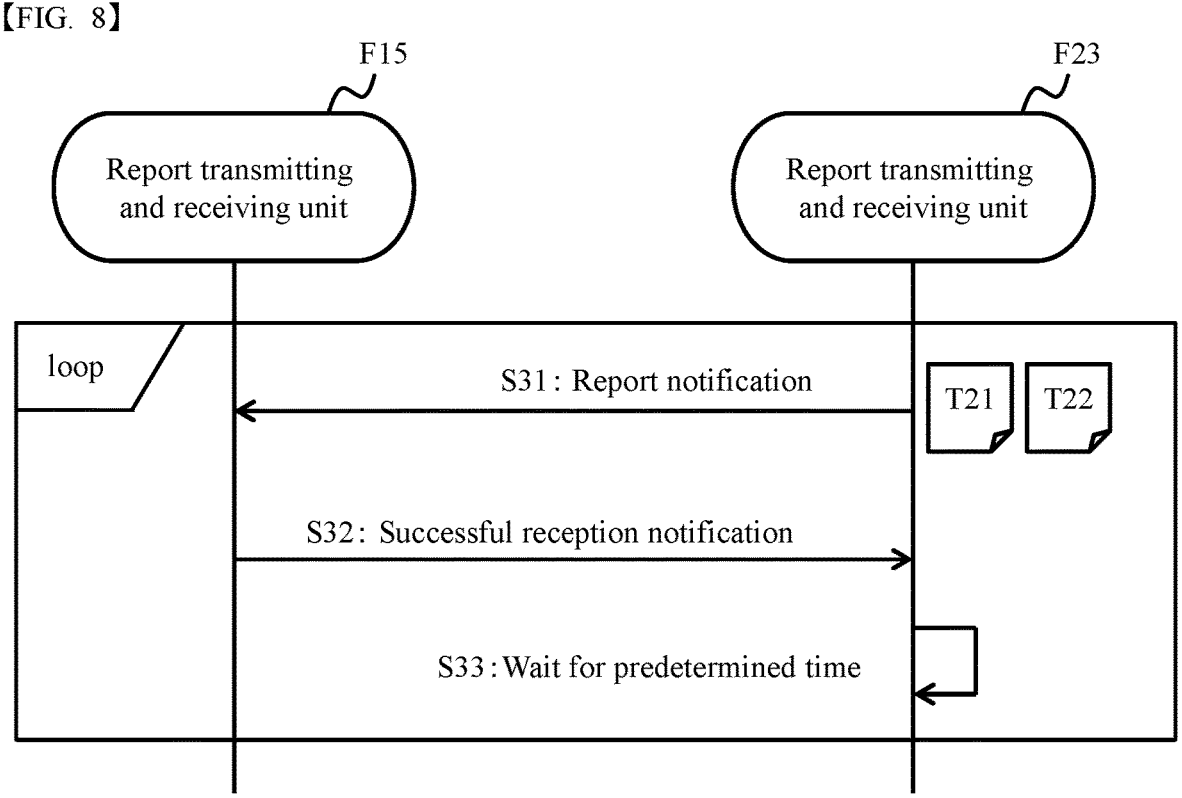

[FIG. 9]
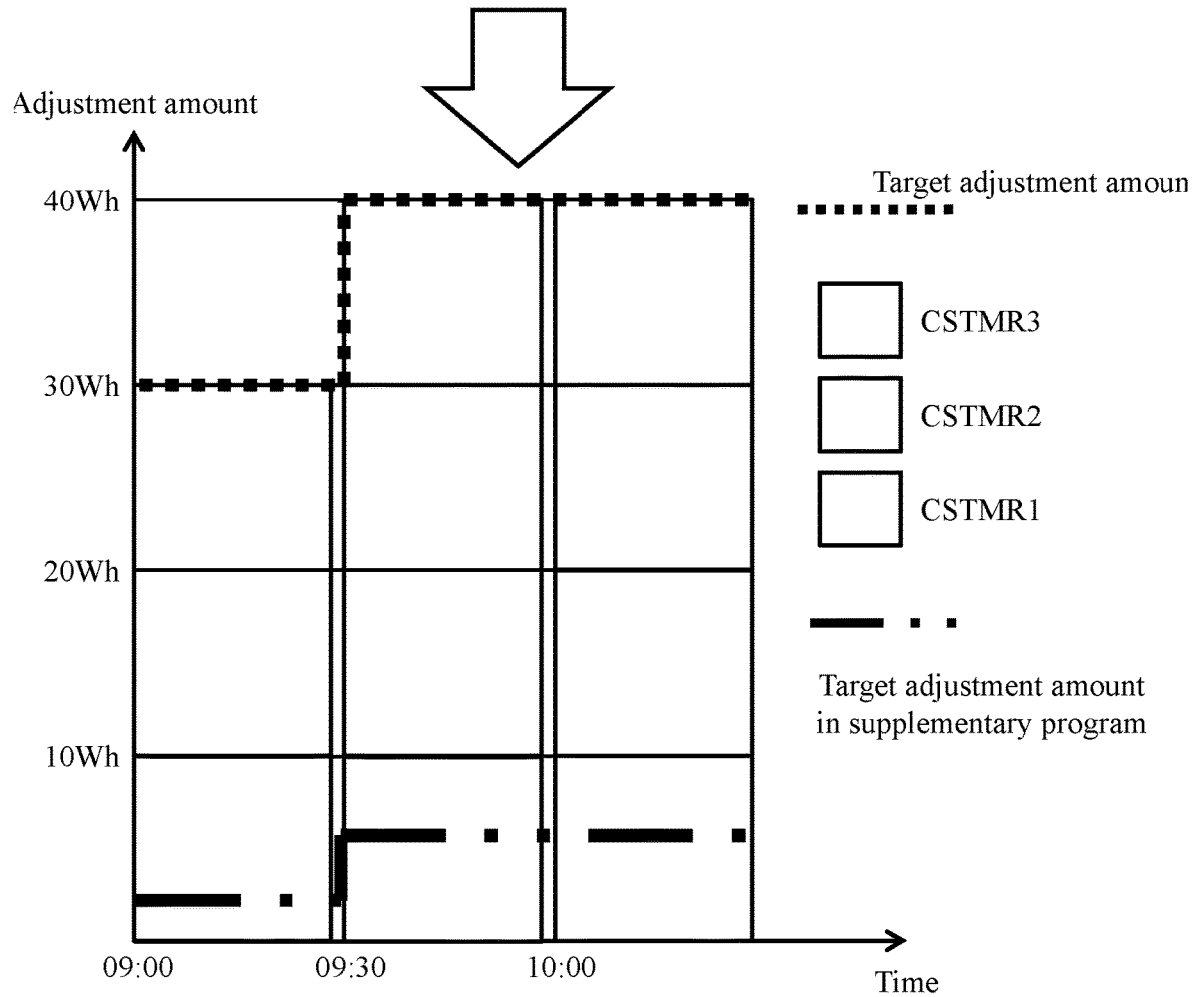

【FIG. 10】
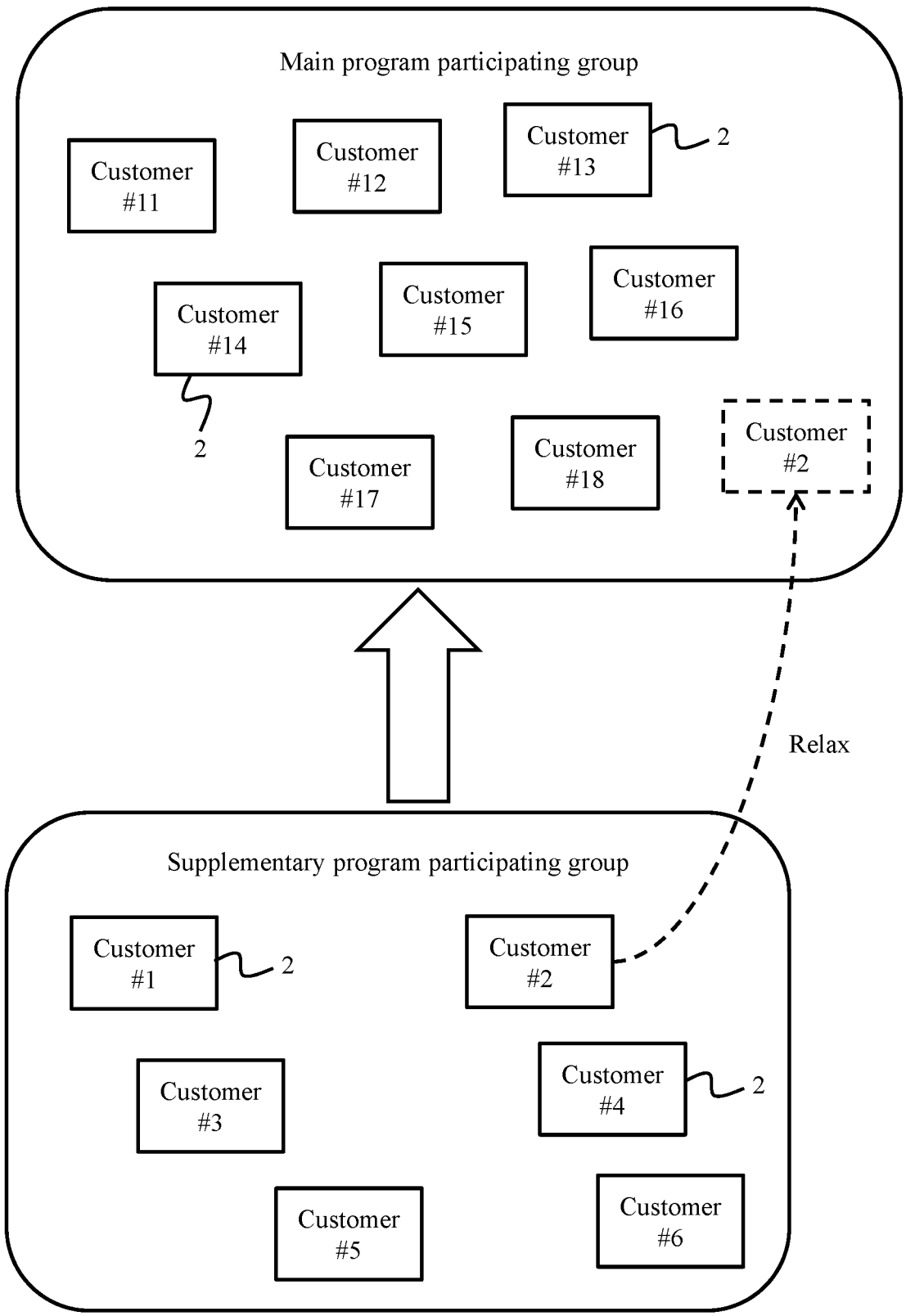

【FIG. 11】

| | Customer table T11 (2) | | | |
|---|---|---|---|---|
| C110 | Customer terminal ID | CSTMR1 | CSTMR2 | CSTMR3 |
| C111 | Customer terminal address | 1XY.123.123.121 | 1XY.123.123.122 | 1XY.123.123.123 |
| C112 | Capability of participating event 1 | Can participate | Can participate | Can participate |

[FIG. 12]

| | Item name | Content |
|---|---|---|
| C210 | First report information T21 | |
| | Customer terminal ID | CSTMR1 |
| C211 | Event ID | Event 1 |
| C212 | Maximum duration | 3 |
| C213 | Shortest acceptable duration | 1 |
| C214 | Minimum downtime | 1 |
| C215A | Smallest acceptable adjustment amount 09:00 | 5 |
| C215B | Smallest acceptable adjustment amount 09:30 | 5 |
| C215C | Smallest acceptable adjustment amount 10:00 | 5 |
| C216A | Maximum adjustable amount 09:00 | 20 |
| C216B | Maximum adjustable amount 09:30 | 20 |
| C216C | Maximum adjustable amount 10:00 | 20 |

【FIG. 13】

| Second report information T22 ||
|---|---|
| Item name | Content |
| Customer terminal ID | CSTMR1 |
| Date | 2015/01/01 |
| Time zone | 00:30-01:00 |
| Consumption amount | 100Wh |

C220: Customer terminal ID
C221: Date
C222: Time zone
C223: Consumption amount

[FIG. 14]

| | Customer table T11 (3) | | | |
|---|---|---|---|---|
| C110 | Customer terminal ID | CSTMR1 | CSTMR2 | CSTMR3 |
| C111 | Customer terminal address | 1XY.123.123.121 | 1XY.123.123.122 | 1XY.123.123.123 |
| C112 | Capability to participate in event 1 | Can participate | Can participate | Can participate |
| C113 | Maximum duration Dumax | 3 | 3 | 2 |
| C114 | Shortest acceptable duration Dumin | 1 | 2 | 2 |
| C115 | Minimum downtime Dtmin | 1 | 1 | 1 |
| C116A | Smallest acceptable adjustment amount Awmin 09:00 | 5 | 5 | 0.01 |
| C116B | Awmin 09:30 | 5 | 5 | 300 |
| C116C | Awmin 10:00 | 5 | 5 | 10 |
| C117A | Maximum adjustable amount Awmax 09:00 | 20 | 20 | 0.01 |
| C117B | Awmax 09:30 | 20 | 20 | 100 |
| C117C | Awmax 10:00 | 20 | 20 | 100 |

【FIG. 15】

| | # | Item name | Content |
|---|---|---|---|
| | \multicolumn{3}{c}{Adjustable amount defining table T19} | |
| C190 | 1 | Maximum adjustable amount (Awmax) | Maximum adjustable amount on daily basis reported from each customer. Different values may be set to different periods |
| C191 | 2 | Predicted adjustable amount (Awp) | Adjustable amount of each customer on daily basis predicted by adjustable amount predicting unit. Different values may be set to different periods |
| C192 | 3 | Final adjustable amount predicted value (Awfp) | Maximum adjustable amount employed for creating program. Different values may be set to different periods |

[FIG. 16]

| | Customer table T11 (4) | | | |
|---|---|---|---|---|
| C110 | Customer terminal ID | CSTMR1 | CSTMR2 | CSTMR3 |
| C111 | Customer terminal address | 1XY.123.123.121 | 1XY.123.123.122 | 1XY.123.123.123 |
| C112 | Capability to participate in event 1 | Can participate | Can participate | Can participate |
| C113 | Dumax | 3 | 3 | 2 |
| C114 | Dumin | 1 | 2 | 2 |
| C115 | Dtmin | 1 | 1 | 1 |
| C116A | Awmin 09:00 | 5 | 5 | 0.01 |
| C116B | Awmin 09:30 | 5 | 5 | 310 |
| C116C | Awmin 10:00 | 5 | 5 | 10 |
| C117A | Awmax 09:00 | 20 | 20 | 0.01 |
| C117B | Awmax 09:30 | 20 | 20 | 100 |
| C117C | Awmax 10:00 | 20 | 20 | 100 |
| C118A | Predicted adjustable amount Awp 09:00 | 10 | 30 | 30 |
| C118B | Awp 09:30 | 10 | 30 | 30 |
| C118C | Awp 10:00 | 10 | 30 | 30 |
| C119A | Final adjustable amount predicted value Awfp 09:00 | 10 | 20 | 0.01 |
| C119B | Awfp 09:30 | 20 | 20 | 20 |
| C119C | Awfp 10:00 | 20 | 20 | 20 |

[FIG. 17]

| | Customer table T11 (5) | | | |
|---|---|---|---|---|
| C110 | Customer terminal ID | CSTMR1 | CSTMR2 | CSTMR3 |
| C111 | Customer terminal address | 1XY.123.123.121 | 1XY.123.123.122 | 1XY.123.123.123 |
| C112 | Capability to participate in event 1 | Can participate | Can participate | Can participate |
| C113 | Dumax | 3 | 3 | 2 |
| C114 | Dumin | 1 | 2 | 2 |
| C115 | Dtmin | 1 | 1 | 1 |
| C116A | Awmin 09:00 | 5 | 5 | 0.01 |
| C116B | Awmin 09:30 | 5 | 5 | 10 |
| C116C | Awmin 10:00 | 5 | 5 | 10 |
| C117A | Awmax 09:00 | 20 | 20 | 0.01 |
| C117B | Awmax 09:30 | 20 | 20 | 100 |
| C117C | Awmax 10:00 | 20 | 20 | 100 |
| C118A | Predicted adjustable amount Awp 09:00 | 10 | 30 | 30 |
| C118B | Awp 09:30 | 10 | 30 | 30 |
| C118C | Awp 10:00 | 10 | 30 | 30 |
| C119A | Final adjustable amount predicted value Awfp 09:00 | 10 | 20 | 0.01 |
| C119B | Awfp 09:30 | 20 | 20 | 20 |
| C119C | Awfp 10:00 | 20 | 20 | 20 |

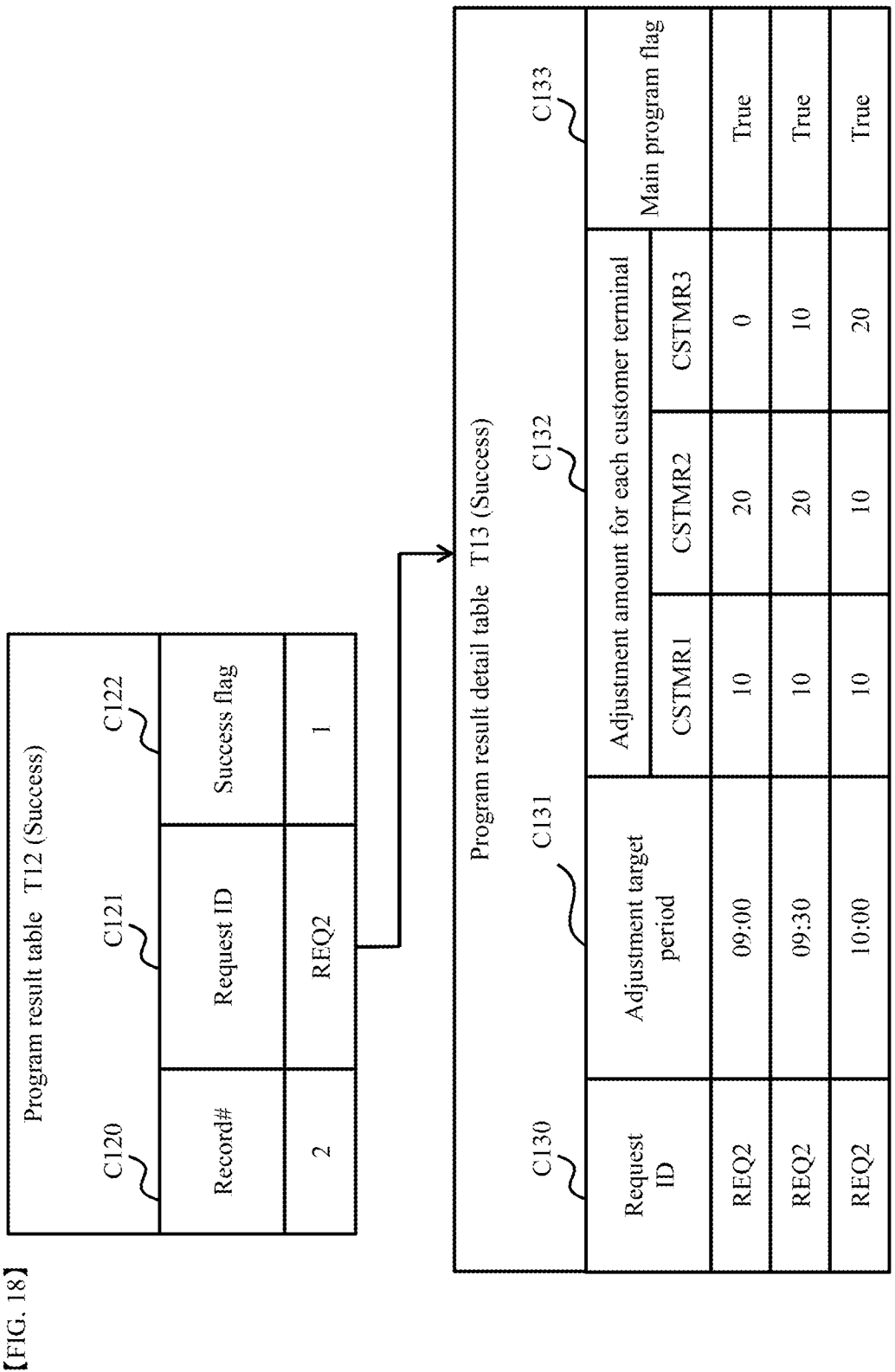
[FIG. 18]

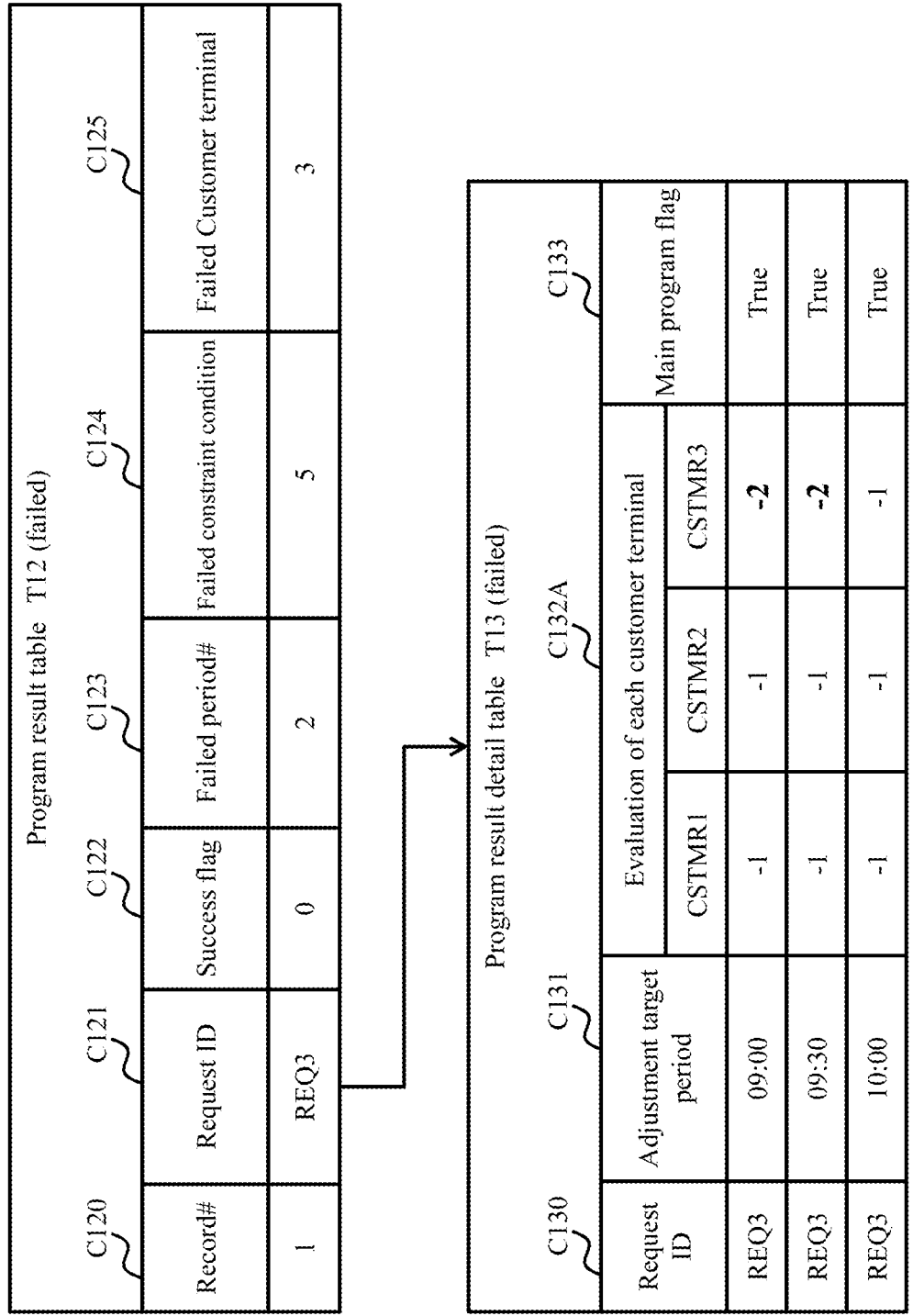

[FIG. 20]

| | Constraint condition tableT15 | |
|---|---|---|
| C150 | C151 | C152 |
| Condition number | Detail | Constraint flag for each customer |
| 1 | Sum of the adjustment amount upper limit values of the customer terminals is equal to or larger than a target value | False |
| 2 | Duration of each customer terminal is equal to or shorter than the maximum duration | True |
| 3 | Duration of each customer terminal is equal to or longer than the minimum duration | True |
| 4 | Minimum downtime of each customer terminal can be ensured | True |
| 5 | Adjustment amount that is equal to or larger than smallest acceptable adjustment value is allocated to each customer terminal | True |

[FIG. 21]
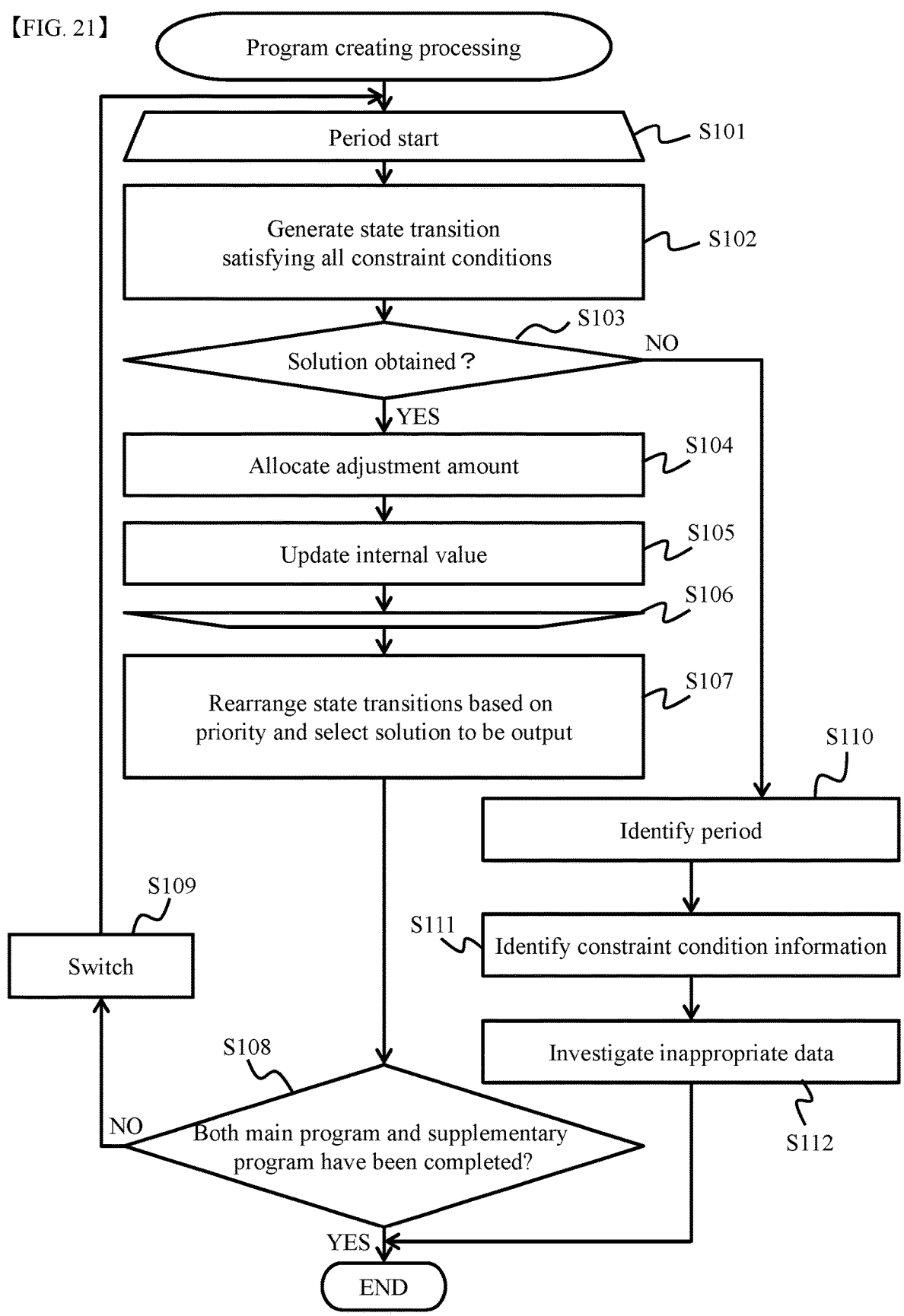

[FIG. 22]

| Condition relaxing rule table T14 | | | |
|---|---|---|---|
| C140 | C141 | C142 | C143 |
| Condition number | Relaxing condition name | relaxing order | relaxing value |
| 1 | Supplementary adjustment ratio | 3 | -1person |
| 2 | Smallest acceptable adjustment amount | 1 | -300Wh |
| 3 | Shortest acceptable duration | 2 | -1period |

[FIG. 23]

| Record # | Request ID C121 | Success flag C122 | Failed period# C123 | Failed constraint condition C124 | Failed constraint terminal C125 | Relaxed condition flag C126 |
|---|---|---|---|---|---|---|
| | | | | | | 000 |
| | | | | | | 000 |
| 1 | REQ2 | 1 | 0 | 0 | 0 | 000 |
| | | | | | | 000 |
| 2 | REQ3 | 1 | 0 | 0 | 0 | 000 |
| | | | | | | 010 |
| | | | | | | 111 |
| 3 | REQ4 | 0 | 1 | 1 | - | 111 |
| | | | | | | 111 |

Program result table T12A

↓ ↓ ↓
CSTMR1 CSTMR2 CSTMR3

0 0 0 ← Relaxed condition 3
0 0 0 ← Relaxed condition 2
0 0 0 ← Relaxed condition 1

[FIG. 24]
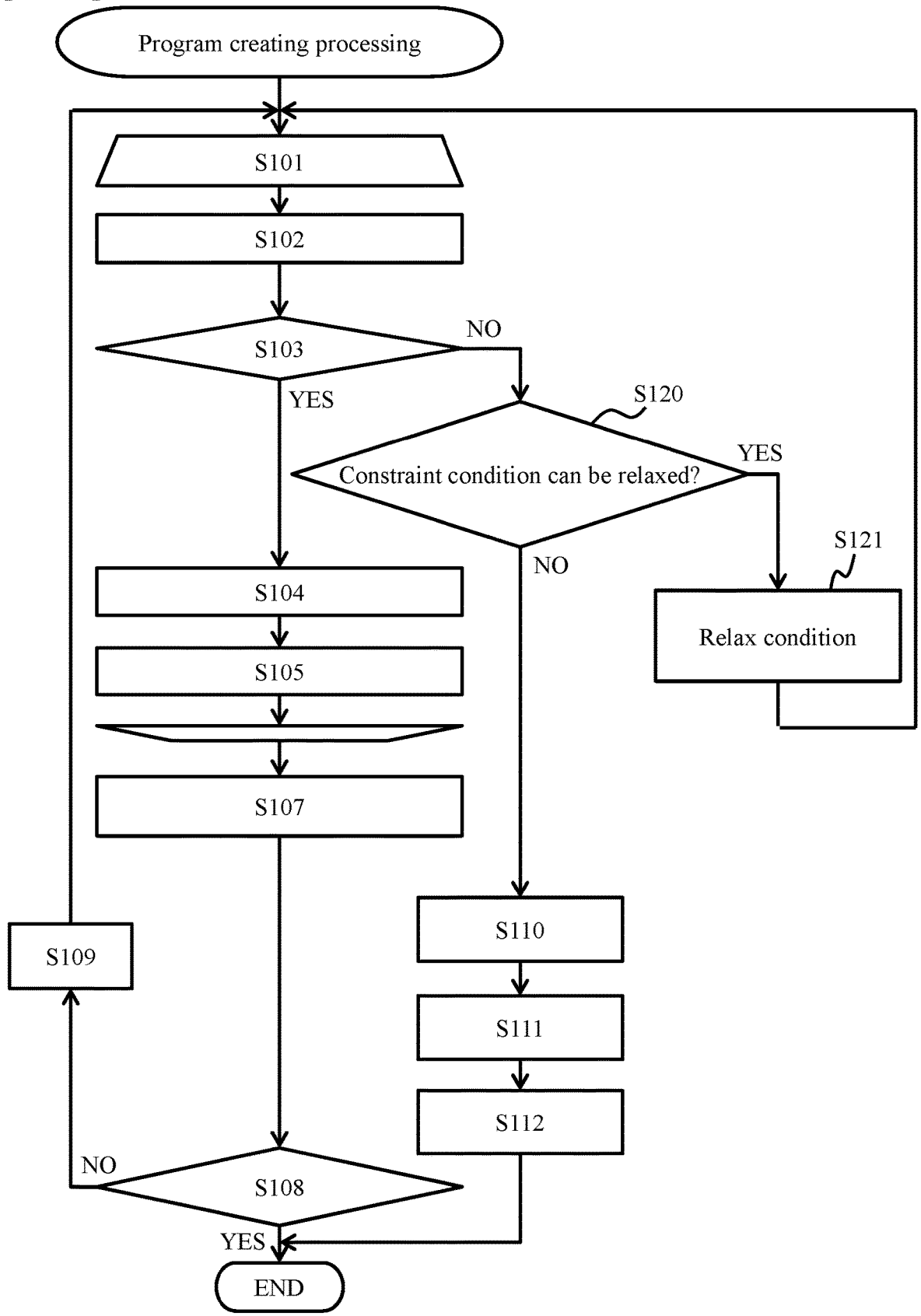

[FIG. 25]
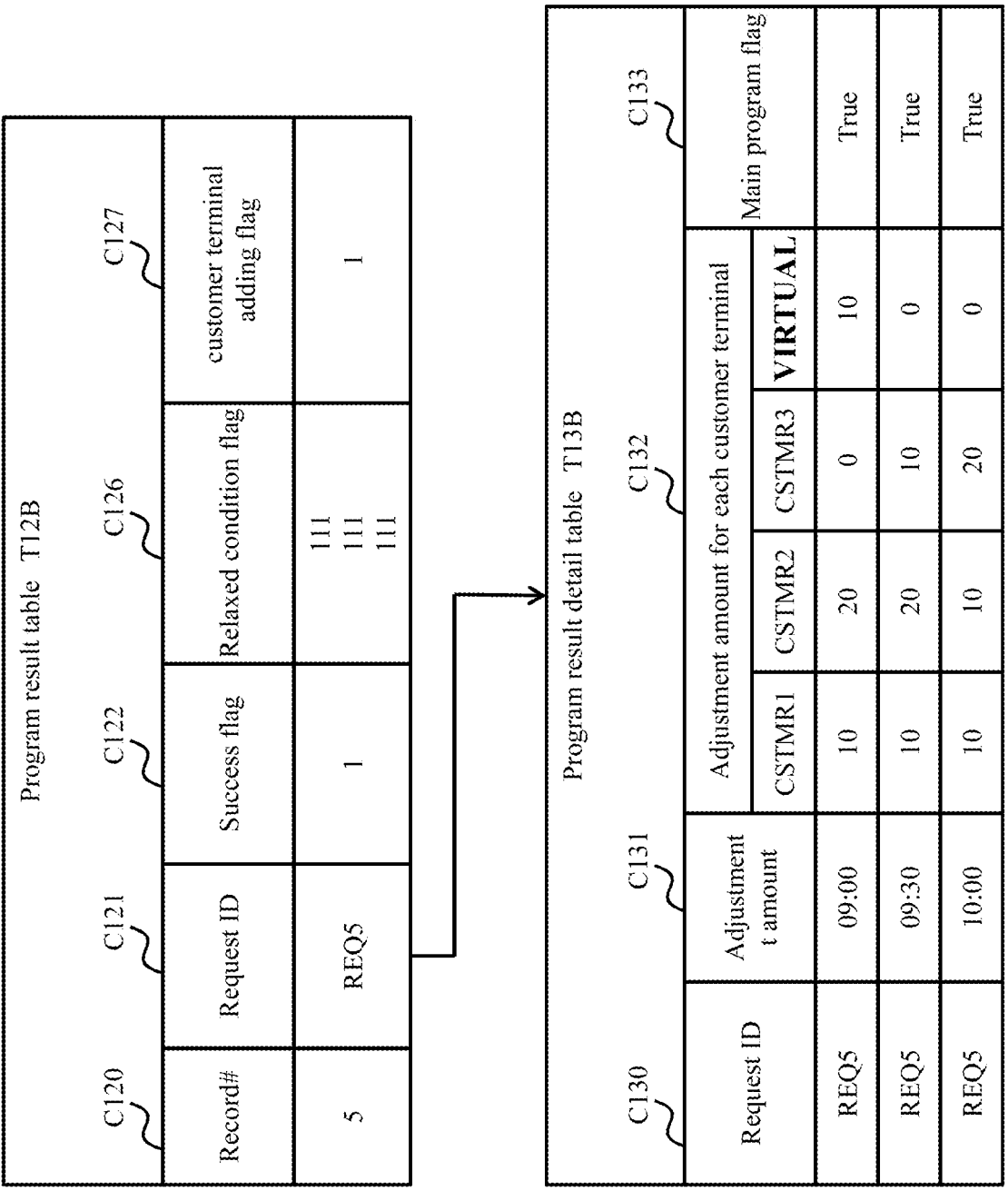

[FIG. 26]
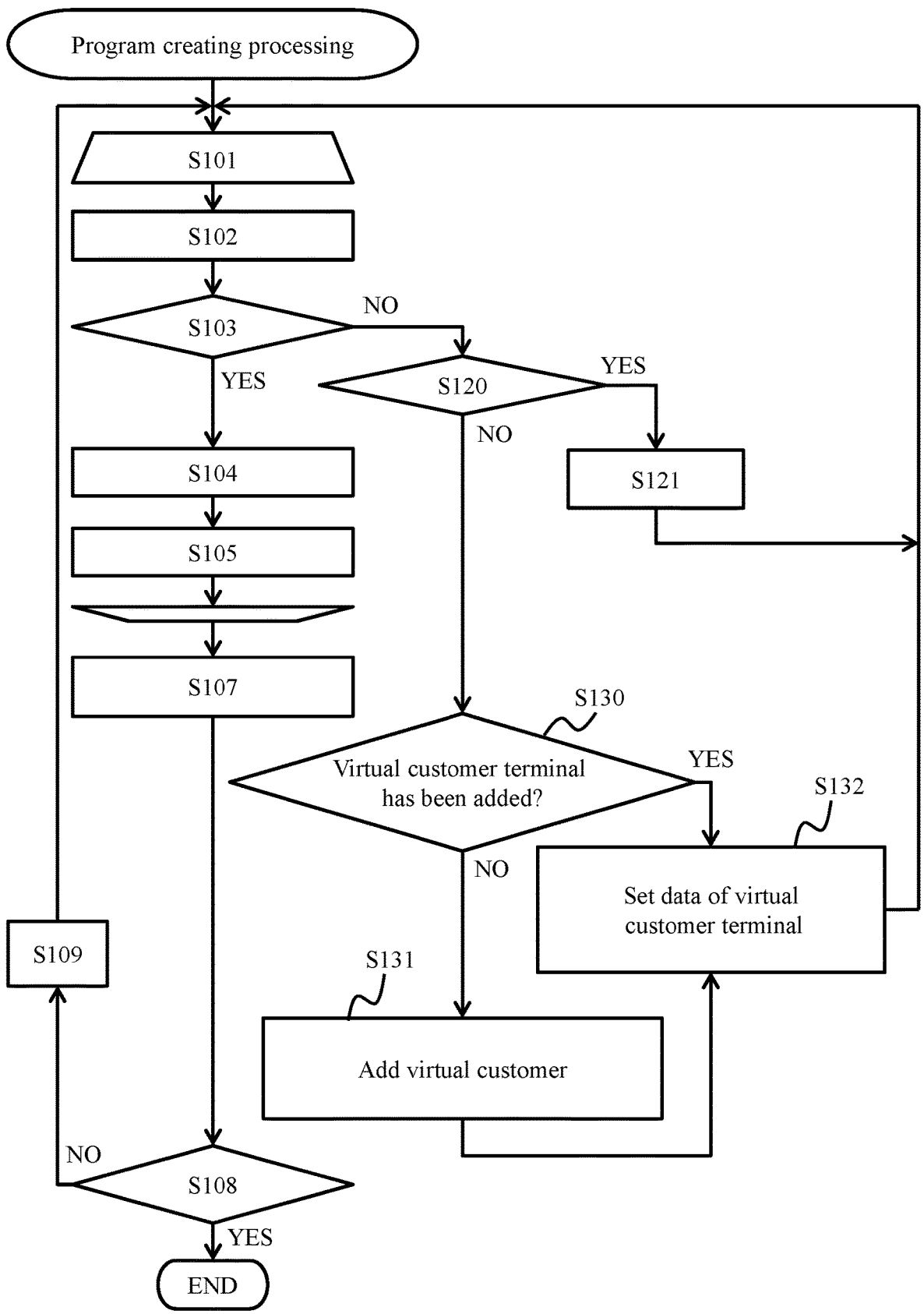

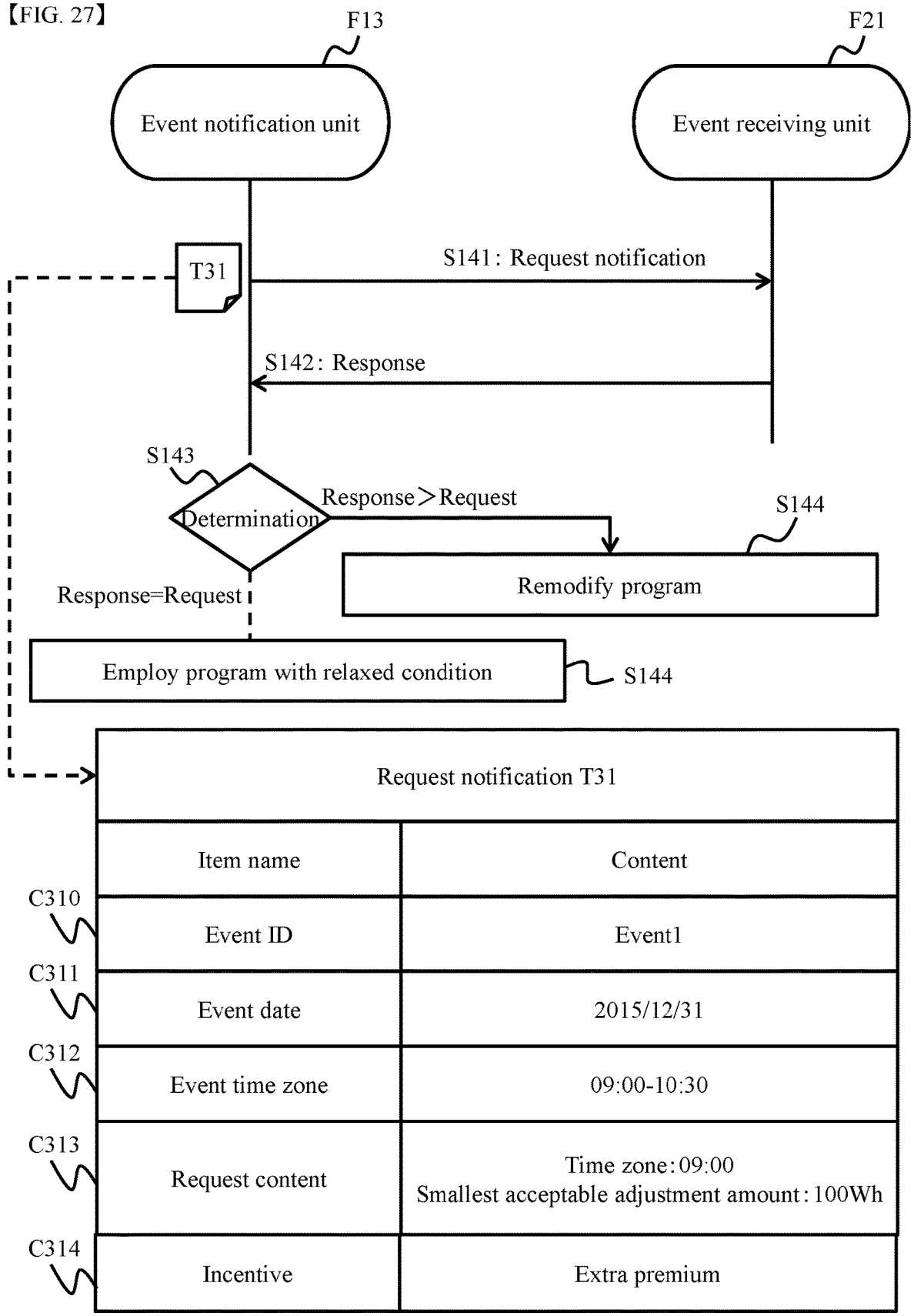
[FIG. 27]

ELECTRIC POWER DEMAND ADJUSTMENT PROGRAM MANAGEMENT APPARATUS AND ELECTRIC POWER DEMAND ADJUSTMENT PROGRAM MANAGEMENT METHOD

BACKGROUND OF THE INVENTION

1. Field of the Invention

The present invention relates to an electric power demand adjustment program management apparatus and an electric power demand adjustment program management method.

2. Description of the Related Art

An electric power demand fluctuates daily. When such an electric power demand has a peak in a certain time block power companies need to be sufficiently operated and equipped with a sufficient facility to satisfy the corresponding peak demand. A large difference between supply and demand in electric power causes a problem in terms of grid stability and electric power quality.

Thus, a demand response (hereinafter, referred to as "DR", as appropriate) is considered, in which a power supplier side requests an electric power customer side to reduce or increase the amount of electric power consumption.

The DR for manipulating an electric power consumption amount has been implemented with a manual communication unit such as a telephone, A standard specification OpenADR 2.0b ("OpenADR Alliance Releases 2.0b Profile Specification for Full Featured Demand Response Programs", published, by OpenADR Alliance, July 2013, URL=http://www.openadr.org/index.php?option=com_content&view=article &id=84: openadr-alliance-releases-2-0b-profile-specification&catid=21:press-releases&Itemid=121) for automatic DR was established around the year 2013, and since then the automatic DRs have been increasingly employed. This standard specification defines how the communications are performed, and does not define how the DR program is established.

Based on EiEvent and EiReport that are main functions in OpenADR 2.0b, a communication specification ("Demand and response interface specification version 1.0 (Draft)", published by JSCA, May 2013, URL=http://www.meti.go.jp/press/2013/05/20130515004/20130515004-7.pdf) for the DR in Japan has been provided as a subset of OpenADR 2.0b.

The DR program, is established as a program, for determining how far and in which time block a device belonging to a customer should be adjusted (Japanese Patent Application Laid-open No. 2013-9565). In Japanese Patent Application Laid-open No. 2013-9565, a DR program with which a target cannot be achieved is acceptable, and thus in Japan the strict requirements are not imposed on the DR and it is considered that it is enough as long as the DR is made the most of even if targets therefor are not achieved, as described in Japanese Patent Application Laid-open No. 2013-9565.

SUMMARY OF THE INVENTION

When a DR program achieving a target cannot be established, a planner of the DR program attempts to reestablish the program through performing any one of the following operations so that the DR program can established.

As a first operation, the planner of the DR program requests a customer participating in the DR program to lower a customer desired value. For example, the planner of the DR program requests the customer to lower the desired value of a smallest acceptable allocated adjustment amount.

As a second operation, the planner of the DR program again requests a customer, who was requested to participate in the DR program and responded by refusing to participate in the DR program, to participate in the DR program.

The planner of the DR program reviews a request condition such as a restriction and an incentive to provide an advantage to a customer side when issuing the request described above.

Thus, these operations performed so that the DR program achieving the target can be established have been manually, and thus inefficiently performed based on an experience of the planner of the DR program.

In view of the above, an object of the present invention is to provide an electric power demand adjustment program management apparatus and an electric power demand adjustment program management method with which an electric power demand adjustment program can be efficiently established.

To achieve the object, an electric power demand adjustment program management apparatus that manages a program in which an electric power demand is adjusted, the electric power demand adjustment program management apparatus including: a communication unit that performs bidirectional communications with a plurality of customer terminals that manage devices on a customer side through a communication network; a program unit that creates an electric power demand adjustment program showing a demand adjustment amount allocated to at least one first customer terminal, selected from the plurality of customer terminals, in each predetermined time segment, based on a predetermined constraint condition set in advance and predetermined customer side information acquired from the plurality of customer terminals through the communication unit; a program execution instruction unit that, when the program unit has successfully created the electric power demand adjustment program, transmits the electric power demand adjustment program created by the program unit to the first customer terminal and instructs the first customer terminal to execute the electric power demand adjustment program; and a providing unit that, when the program unit fails to create the electric power demand adjustment program, provides an investigation result information including a result of investigating a cause of the failure.

With the present invention, when an electric power demand adjustment program fails to be created, investigation result information including a result of investigating a cause of the failure to create the program can be provided. Thus, by using the investigation result information, the electric power demand adjustment program can be efficiently re-created.

BRIEF DESCRIPTION OF THE DRAWINGS

FIG. 1 is a diagram illustrating an entire overview of an embodiment of the present invention.

FIG. 2 is a block diagram illustrating an electric power demand management system employing a DR server.

FIG. 3 is a diagram illustrating a system configuration of the DR server and a customer terminal.

FIG. 4 is a diagram illustrating tables stored in a storage device of the DR server.

FIG. 5 illustrates a customer table in an initial state.

FIG. 6 is a diagram illustrating a sequence in which the DR server notifies the customer terminal of a DR event, and a configuration of an event table.

FIG. 7 is a diagram illustrating a sequence in which the customer terminal notifies the DR server of a DR response and a configuration of the DR response notification.

FIG. 8 is a diagram illustrating a sequence in which the customer terminal notifies the DR server of a DR report.

FIG. 9 is a diagram illustrating the DR program in detail.

FIG. 10 is a diagram schematically illustrating a relationship between customers participating in a main program and customers participating in a supplementary program.

FIG. 11 illustrates a customer table obtained by registering a capability to participate in the DR program.

FIG. 12 illustrates an example of first report information.

FIG. 13 illustrates an example of second report information.

FIG. 14 illustrates a customer table as a result of further registering the first report information.

FIG. 15 illustrates a table in which types of an adjustable amount are defined.

FIG. 16 illustrates an example of a customer table as a result of predicting the adjustable amount.

FIG. 17 illustrates another example of the customer table as a result of predicting the adjustable amount.

FIG. 18 is a diagram illustrating an output result in a case where the DR program has been successfully established.

FIG. 19 is a diagram illustrating an output result in a case where the DR program has failed to be established.

FIG. 20 illustrates a table in which constraint conditions are managed.

FIG. 21 illustrates a flowchart of processing of establishing the DR program.

FIG. 22 is a table in which conditions for relax targets are managed according to a second embodiment.

FIG. 23 is a diagram illustrating an output result of the DR program.

FIG. 24 illustrates a flowchart of processing of establishing the DR program.

FIG. 25 illustrates a flowchart of processing of establishing the DR program according to a third embodiment.

FIG. 26 illustrates a flowchart of processing of establishing the DR program.

FIG. 27 illustrates a flowchart of processing of reissuing a request to a customer terminal with an increased incentive according to a fourth embodiment.

DESCRIPTION OF THE PREFERRED EMBODIMENT

An embodiment of the present invention is described below with reference to the drawings. A request to reduce an electric power demand and a request to increase an electric power demand are only different from each other in how an electric power consumption is changed (reduced or increased). Thus, the case where the request to reduce the electric power demand is issued is mainly described, and the case where the request to increase the electric power demand is issued is omitted. It is a matter of course that the present invention can be applied to the case where the request to increase the electric power demand is issued.

In the present embodiment, an electric power demand adjustment program management system will be described, in which an electric power supplier or a DR server 1 on a side of an electric power aggregator that received a request from the electric power supplier requests a customer terminal 21 to adjust an electric power demand.

In the present embodiment, communications for DR between the DR server 1 and the customer terminal 21 are implemented with an efficient method. For example, the DR server 1 has a function of notifying a customer, who might participate in the event, of an event ID for identifying a DR event and event date and time indicating date and time of the event. An example of such a function includes an EiEvent function defined in OpenADR 2.0b. For example, the DR server 1 further has a function of transmitting a resource amount and an actually measured value related to DR between a DR requestor and a DR executor, periodically, or when requested. An example of such a function includes an EiReport function defined in OpenADR 2.0b. These functions defined in OpenADR 2.0b can be suitably used in the present embodiment. However, the present embodiment is not limited to these functions defined in OpenADR 2.0b.

For example, the BR server 1 includes an event notification function, a DR response receiving function, a report receiving function, an adjustment feasible amount predicting function, a DR program function, and a providing function.

For example, as defined in EiEvent function, the event notification function is a function of notifying the customer terminal 21 of an event (also referred to as a DR event) of requesting electric power demand amount adjustment. For example, the event notification function corresponds to a DR program execution instruction unit F13 illustrated in FIG. 1, and an event notification unit F13 illustrated in FIG. 3. The DR program execution instruction unit illustrated in FIG. 1 and the event notification unit illustrated in FIG. 3 execute the same function (event notification function), and thus are denoted with the same reference numeral.

For example, as defined in EiEvent, the DR response receiving function is a function of receiving from the customer terminal 21, a response indicating whether the customer terminal 21 participates in the event. The DR response receiving function corresponds to a DR response receiving unit F14 illustrated in FIG. 3.

For example, as defined in EiReport, the report receiving function is a function of receiving from the customer terminal 21, reported values indicating a potentially adjustable amount of the customer terminal 21. For example, the reported values include: a maximum adjustable amount; a smallest acceptable adjustment amount indicating the smallest acceptable adjustment amount; a maximum duration indicating a maximum period during which the adjustment can be continuously executed; a minimum duration indicating a desired minimum period during which the customer as a target of the allocation in the DR executes the adjustment; and a minimum downtime indicating a minimum downtime required for the customer as a target of the allocation in the DR. Some of these reported values are values desired by the customer terminal 21 (values desired by a customer 2 with the customer terminal 21). Each of the remaining ones of the reported values is either an actually measured value or a value defined in the specification. The report receiving function corresponds to a report transmitting and receiving unit F15 illustrated in FIG. 3. In FIG. 1, the DR response receiving unit F14 and the report transmitting and receiving unit F15 are illustrated as being incorporated in a communication unit 113 for the sake of description.

The adjustment feasible amount predicting function is a function of predicting an adjustable amount of the customer terminal 21 based on information serving as a basis of the prediction. The adjustment feasible amount predicting function compares the predicted adjustment amount and the value reported from the customer terminal 21, and employs the smaller one of the values as a value to be used to create the DR program. The adjustment amount used to create the DR program is referred to as a final adjustable amount or a final adjustable amount predicted value in the present embodiment. For example, the information as the basis of the prediction includes: an adjustment amount history; past or forecasted weather information; calendar information indicating whether a day in the past or the future is a weekday or a non-working day, and the like. The adjustment feasible amount predicting function corresponds to an adjustment feasible amount predicting unit F12 illustrated in FIGS. 1 and 3.

The DR server 1 stores various management tables including a customer table T11, an event table T10, and the like, as illustrated in FIG. 3. The customer table T11, which is one of the tables described in detail later, is briefly described. For example, the customer table T11 records address information for communicating with each customer terminal 21 and information indicating capability to participate in the event, as well as the reported values, the predicted adjustable amount, and the final adjustable amount predicted value that are described above.

The DR program function is a function of creating the DR program based on information serving as a basis of the creation of the program. The DR program function corresponds to a DR program unit F11 illustrated in FIGS. 1 and 3.

More specifically, the DR program function creates the DR program for determining an adjustment amount to be allocated to a customer terminal 21 for each predetermined time segment, based on a predetermined constraint condition set in advance and predetermined customer side information acquired from each customer terminal 21. The DR program function may create a supplementary program, supporting the DR program, when this DR program is created.

In the present embodiment, the DR program includes a main program and a supplementary program that are separately established as described later. The main program is a program serving as a core of the DR program, and the supplementary program is a program for mediating the adverse effect of sudden withdrawal (opt-out) of the customer-terminal 21. The customer-terminal 21 that participates in the main program is referred to as "first customer terminal", and the customer terminal 21 that participates in the supplementary program is referred to as "second customer terminal". The term "program is established" may also be written as "program is created", or "program is generated" in the description below.

For example, the predetermined constraint condition includes a condition to be satisfied to achieve a target adjustment amount of the DR program. For example, the constraint conditions include a condition satisfied when the sum of the predicted values of the final adjustable amount of the customer terminals 21 is equal to or larger than the target adjustment amount. For example, the predetermined customer side information is the reported values acquired from the customer terminal 21.

The DR program function uses the target adjustment amount, the final adjustable amount predicted value, the reported values except for the maximum adjustable value, and a supplementary adjustment amount, as the information on which the creation of the program is based. The supplementary adjustment amount represents a ratio of the target adjustment amount in the supplementary program to the target adjustment amount in the main program (the supplementary adjustment amount=the target adjustment amount in the supplementary program/the target adjustment amount in the main program).

The DR program function receives the information serving as a basis of the creation of the program, and determines for each predetermined time segment, whether each of the constraint conditions for the target adjustment amount, the final adjustable amount predicted value, and the reported values except for the maximum adjustable value is satisfied. Thus, the DR program function establishes the DR program with which the adjustment amount and the customer terminal 21 allocated with the adjustment amount are determined for each time segment. The predetermined time segment is hereinafter also referred to as a period or a time block.

The DR server 1 of the present embodiment further includes a function of facilitating re-creation of a new program when the DR program function fails to create the DR program as described later. For example, this program re-creation facilitating function can be roughly divided into a function of investigating and providing a cause of the failure, and a function of automatically or semi-automatically re-creating the DR program.

For example, the function of re-creating the DR program may include at least one of: a function of facilitating planning of a new program by relaxing the constraint condition; and a function of facilitating the planning of a new program by introducing a virtual customer terminal. The function of re-creating the DR program may further include a function of automatically negotiating with the customer terminal 21 to implement the newly planned program.

The function of investigating the cause of the failure to create the DR program and providing the result of investigation provides a planner of the DR program and the like with investigation result information, including the cause of the failure. The investigation result information includes: information for identifying a period with no solution satisfying the constraint conditions; information for identifying the constraint condition corresponding to the cause of the failure; and information for identifying the customer terminal corresponding to the cause of the failure. When predetermined customer side information, acquired from a customer terminal includes an inappropriate value, the investigation result information may further include information for identifying the inappropriate value and alerting the planner. For example, the function of providing the investigation result determines that a desired smallest acceptable adjustment amount of the customer terminal 21 exceeding the final adjustable amount predicted value to be achievable by the customer terminal 21 is the inappropriate value. The function of providing the investigation result can detect the customer terminal and the period related to the inappropriate value, and warn the planner.

FIGS. 1 and 3 are related to each other in such a manner that the function of investigating the cause of the failure and providing the investigation result corresponds to a detail creating unit F117 illustrated in FIGS. 1 and 3. The detail creating unit F117 works together with the report transmitting and receiving unit F15 and a user interface unit 115 illustrated in FIG. 3 to notify a user of detail result information described letter with reference to FIG. 19.

The function of automatically or semi-automatically re-creating the DR program corresponds to a constraint condition relaxing unit F116 illustrated in FIGS. 1 and 3.

The function F116 of re-creating the DR program may include a function F118 of introducing the virtual customer terminal to facilitate the planning of the new program. A function of automatically negotiating with the customer terminal 21 to implement the newly planned, program corresponds to a negotiation unit F119.

The function F117 of investigating the cause of the failure to create the DR program and providing the investigation result provides the investigation result information, including the cause of the failure, to the planner of the DR program and the like. The investigation result information includes: information for identifying a period with no solution satisfying the constraint conditions; information for identifying the constraint condition corresponding to the cause of the failure; and information for identifying the customer terminal corresponding to the cause of the failure. When predetermined customer side information, acquired, from a customer terminal, includes an inappropriate value, the investigation result information may further include information for identifying the inappropriate value and alert the planner. For example, the function of providing the investigation result determines that a desired smallest acceptable adjustment amount of the customer terminal 21, exceeding the final adjustable amount predicted value to be achievable by the customer terminal 21 is the inappropriate value. The function F117 of providing the investigation result can detect the customer terminal and the period related to the inappropriate value, and warn the planner.

For example, the customer terminal 21 includes an event receiving function, a DR response transmitting function, a report transmitting function, and a device controlling function. As defined in EiEvent function for example, the event receiving function receives an event for requesting the adjustment of the electric power demand amount, from the DR server 1. The event receiving function, corresponds to an event receiving unit F21 illustrated in FIG. 3.

As defined in EiEvent function for example, the DR response transmitting function transmits a response, indicating whether the customer terminal participates in the event, to the DR server 1. The DR response transmitting function corresponds to a DR response transmitting unit F22 illustrated in FIG. 3.

As defined in EiReport function for example, the report transmitting function transmits to the DR server 1 the reported value indicating the potentially adjustable amount and a measured value of an electric power consumption amount. The report transmitting function corresponds to a report transmitting and receiving unit F23 illustrated in FIG. 3. The report transmitting and receiving unit F23 can receive information and the like transmitted from the negotiation unit F119 and the like, and display the information on a user-interface unit 215.

The device controlling function controls an operation of a control target device 22 illustrated in FIG. 2. The device controlling function corresponds to a device controlling unit F24 illustrated in FIG. 3.

In the present embodiment, the DR program can be efficiently created, the program can be created with a shorter period of time and smaller amount of work, and thus higher usability can be achieved for the aggregator and the like that establish the DR program. Furthermore, in the present embodiment, the DR program can be created in a shorter period of time than before, and thus the DR program can be established even when there is not much time between the creation and execution. Furthermore, in the present embodiment, the DR program can be created in a shorter period of time than before, and thus a smaller opportunity loss in electric power transaction can be achieved.

The description in this specification is given below with the following terms.

Period: a minimum unit time used when establishing DR program, and is 30 minutes for example.

Opt-in: an act of a customer terminal participating in a DR event.

Opt-out: an act of the customer terminal withdrawing from (no longer participating in) the DR event Main program: a program of allocating an adjustment amount to each customer terminal to achieve the target adjustment amount, and is a term used as a comparison with the supplementary program.

Supplementary program: a program established to prepare for a situation where the target adjustment amount is no longer achievable by the main program due to the sudden opt-out of the customer terminal.

Now, an example of a method of creating a DR program according to the present embodiment is described. The following steps 1 and 2 are executed in the method of establishing the DR program. Thus, in the present embodiment, a program (main program) in which an adjustment amount and a time block (period) allocated to each customer terminal to achieve the target adjustment amount is determined is established. Through a similar procedure, a supplementary program achieving a target supplementary adjustment value determined at the supplementary adjustment ratio is established.

(Procedure 1) The following constraint conditions are satisfied in each period.

(a) The sum of adjustment amounts of the customer terminals is equal to or larger than a target value.

(b) The adjustment amount of each customer terminal is equal to or larger than the smallest acceptable adjustment amount.

(c) The duration of implementation relative to each customer terminal is equal to or shorter than the maximum duration.

(d) The duration of implementation relative to each customer terminal is equal to or longer than the minimum duration.

(e) Each customer terminal has the minimum downtime.

(Procedure 2) One with the highest priority is selected as the solution.

For example, a higher priority is set to a smaller sum of products of allocated amount and a unit price in all the periods.

The program may be created, taking into consideration a ramp up or ramp down capacity of each customer terminal. In this case, the constraint conditions in Procedure 1 may include "within ramp up or ramp down capacity".

First Embodiment

A first embodiment is described with reference to FIGS. 1 to 15. FIG. 1 is a diagram illustrating an entire overview of the present embodiment. FIG. 1 illustrates a configuration of an embodiment in enough detail to understand and implement the present invention. Thus, the scope of the present invention is not limited to the example illustrated in FIG. 1. In other words, a functional configuration described below is merely an example, and other functional configurations can be employed.

For example, the DR server 1 includes the DR program unit F11, the adjustment feasible amount predicting unit F12, the DR program execution instruction unit F13, the DR response receiving unit F14, and the report transmitting and receiving unit F15 (see FIG. 3), as well as, the user interface unit 115 and the communication unit 113.

For example, the DR program unit F11, serving as a "program unit", includes a creating target program selecting unit F111, a program plan creating unit F112, a determining unit F113, a finishing unit F114, an output unit F115, the constraint condition relaxing unit F116, the detail creating unit F117, the virtual customer terminal adding unit F118, and the negotiation unit F119.

The creating target program selecting unit F111 selects one of the main program and the supplementary program as a creating target. In the present embodiment, a customer terminal (second customer terminal) that participates in the supplementary program is first selected, and then a customer terminal (first customer terminal) that participates in the main program is selected, as described later. However, this should not be construed in a limiting sense, and the customer terminal that participates in the main program may be first selected, and then the customer terminal that participates in the supplementary program may be selected.

The program plan creating unit F112 calculates a program plan of the creating target program (DR program). The adjustment feasible amount predicting unit F12 estimates the adjustable demand amount of each customer terminal 21. The program plan creating unit F112 calculates the program plan based on the predicted adjustable amount (final adjustable amount), the target adjustment amount, and the like.

The determining unit F113 determines whether the program plan created by the program plan creating unit F112 satisfies all the constraint conditions. The program plan satisfying all the constraint conditions is also referred to as "solution" in the present embodiment.

The finishing unit F114 obtains the program plan satisfying all the constraint conditions as the final version by calculating the adjustment amount allocated to each customer terminal 21 in each period, and determining a priority of each customer based on a product of a unit price with incentive and the adjustment amount.

The output unit F115 stores the program thus completed in a storage area, and transmits the program to the DR program execution instruction unit F13. Furthermore, the output unit F115 provides the completed program and detail information to be described later to the planner (a user that operates the DR server 1) through the user interface unit 115.

The DR program execution instruction unit F13 is described as the event notification unit F13 in the description with reference to FIG. 3. The DR program execution instruction unit F13 transmits an event for instructing the execution of the DR program from the communication unit 113 to each customer terminal 21 that participates in the program, through a communication network CN1.

When the determining unit F113 determines that no program plan satisfying all the constraint conditions is found, that is, all the created program plans each fail to satisfy at least one of the constraint conditions, the planner (hereinafter, also referred to as a user) can refer to the program result detail information created by the detail creating unit F117.

Regardless of whether the detail creating unit F117 succeeds or fails to create the program, the information indicating the details of the program can be created. The program result detail information in a case where the program has failed to be created is one example of the "investigation result information".

When the program plan satisfying all the constraint conditions cannot be created, the constraint condition relaxing unit F116 relaxes a predetermined constraint condition in all the constraint conditions, and requests the program plan creating unit F112 to re-create the program plan. For example, the constraint condition relaxing unit F116 relaxes the constraint condition by lowering the smallest acceptable adjustment amount desired by the customer terminal 21 or by shortening the minimum duration desired by the customer terminal 21. The constraint condition relaxing unit F116 gradually relaxes the constraint condition by gradually relaxing a predetermined condition, such as the smallest acceptable adjustment amount and the minimum duration, in accordance with predetermined values. This is for creating a program that can achieve an amount as much close to the original target as possible at the minimum condition relaxation.

When the program plan that satisfies all the constraint conditions cannot be created by relaxing the predetermined condition to the maximum level, the virtual customer terminal adding unit F118 adds a virtual customer terminal 21 that participates in the DR program to theoretically obtain the solution. For example, the virtual customer terminal is a virtual entity introduced to obtain the solution with all the constraint condition satisfied. The virtual customer terminal is defined as a convenient entity with which the constraint condition that has not been able to be satisfied with only the customer terminals 21 in the failed program plan can be satisfied. Thus, the program plan satisfying all the constraint conditions can be created by merely finding the customer terminal 21 that can serve the exact same role as the virtual customer terminal. If the virtual customer terminal is not introduced in the calculation, the calculation needs to be redone for all the customer terminals 21, and thus a long program creating time is required.

The negotiation unit F119 negotiates with the customer terminal 21 related to the constraint condition relaxed by the constraint condition relaxing unit F116, or the customer terminal 21 that is expected to serve exactly like the virtual customer terminal. More specifically, the negotiation unit F119 notifies the customer terminal 21 from which permission is required to relax the constraint condition and the customer terminal 21 that has been requested to participate in the program to replace the virtual customer terminal, and receives a response.

FIG. 2 is a block diagram illustrating the electric power demand management system. The DR server 1 is connected to and can perform bidirectional communications with the customer terminal 21, provided to the customer 2, through a first communication network CN1. The number of each of the customer 2 and the customer terminal 21, which is one in FIG. 2, is more than one in an actual situation. Each customer terminal 21 is connected to the DR server 1.

For example, the customer 2 includes the customer terminal 21, at least one control target device 22, and an electricity meter 23. Each control target device 22 is connected to and can perform bidirectional communications with the customer terminal 21, through a second communication network CN2. The customer terminal 21 is further connected to the meter 23 through the second communication network CN2.

For example, the control target device 22 is an electric power consuming device such as a refrigerator, a freezer, an air conditioner, a lighting device, an electrical motor, an elevator, and a processing machine. The control target device 22 operates by consuming the electric power supplied from a grid 3. The control target device may be, for example, a solar power generation device or a storage battery.

The meter 23 measures the amount of electric power purchased from a grid 3 by the customer 2, and notifies the DR server 1 of the amount. Alternatively, the electric power-consumption of the customer 2 may be acquired from a computer system of a power distribution company.

The first communication network CN1, mainly used for transmission and reception of data, may be a general communication network provided by a telecommunications operator, or may be a unique dedicated communication network. The second communication network CN2, mainly used for device control, may be the general communication network or the unique dedicated communication network. Each of the communication networks CN1 and CN2 may be a wired or wireless network using any communication scheme.

The DR server 1 is connected to and can perform bidirectional communications with an information server 4. The DR server 1 and the information server 4 may be connected to each other through the first communication network CN1 or through another unillustrated communication network. For example, the information server 4 includes: a weather information server that distributes a weather forecast and past weather data; a traffic information server that distributes information on traffic jams and the like; a server that distributes information on entertainment events such as a concert; a news server that distributes news; and the like. The DR server 1 estimates the adjustment feasible amount of each customer terminal 21 by using the information acquired from the information server 4.

FIG. 3 is a diagram illustrating system configurations of the DR server 1 and the customer terminal 21. In the present embodiment, a case where the DR server 1 that establishes the DR program directly communicates with the customer terminal 21 is described as an example. It is to be noted that a sub-aggregator that collectively manages the customers 2 may be provided between the electric power supplier that operates the DR server 1 (or an aggregator requested to perform the operation by the electric power supplier) and the customers 2. The present invention can be applied to a case where the sub-aggregator relays communications between the customer terminal 21 of each customer 2 and the DR server 1. The information server 4 is omitted in FIG. 3.

The DR server 1 that establishes the DR program is connected to and can perform bidirectional communications with the customer terminal 21 of the customer 2 through the first communication network CN1. FIG. 3 illustrates only one of the plurality of customer terminals 21 that are connected to the DR server 1 in the normal situations as described above.

For example, the DR server 1 includes a control unit 110, a central processing unit (CPU) 111, a memory 112, a communication port 113, a storage device 114, and a user interface unit 115. The control unit 110 includes the CPU 111 and the memory 112. The control unit 110, the storage device 114, and the user interface unit 115 are connected to and can perform bidirectional communications with each other through an internal bus. The storage device 114 and the user interface unit 115 can be connected to the communication port 113 through the control unit 110. The communication port 113 and the communication unit 113 illustrated in FIG. 1 correspond to each other and thus are denoted with the same reference numerals.

The user interface unit 115 includes an information output device that provides information to the user and an information input device that receives an instruction and information from the user. For example, the information output device includes a display, a printer, a voice synthesizer device, an email transmission function, and the like. For example, the information input device includes a keyboard, a touch panel, a voice input device, an electronic data reader device, and the like.

The storage device 114 stores a predetermined computer program for implementing various functions and a predetermined table described, later. For example, the predetermined computer program includes the DR program unit F11, the adjustment feasible amount predicting unit F12, the event notification unit F13, the DR response receiving unit F14, and the report transmitting and receiving unit F15. The predetermined table includes the event table T10 and the customer table T11 as well as tables T12 to T18 described later with reference to FIG. 4.

The DR program unit F11 creates the DR program based on the predetermined constraint condition and predetermined customer side information as described later. As described later, the adjustment feasible amount predicting unit F12 estimates the adjustable amount of each customer terminal 21 and selects the more feasible one of the adjustable amount reported from the customer terminal 21 and the predicted adjustable amount.

The event notification unit F13 notifies the customer terminal 21 of an event for requesting execution of the DR program. The DR response receiving unit F14 receives a response (DR response) indicating whether the customer terminal 21 will participate or will not participate in the event. The report transmitting and receiving unit F15 receives information indicating the electric power consumption of the customer 2 from the customer terminal 21. The report transmitting and receiving unit F15 transmits to the customer terminal 21 or displays on the user interface unit 115, the information (program result table and the program result detail table) indicating the detail of the program planning result. The report transmitting and receiving unit F15 may transmit an email of a report indicating the program planning result and the like to the user.

The event table T10 stores the event information as described later with reference to FIG. 6. The customer table T11 stores the customer information in accordance with a progress of the DR program creation, as described later with reference to FIGS. 5, 11, 14, 16, and 17.

An example of a configuration of the customer terminal 21 is described. The customer terminal 21 is installed in various customers 2 such as a company and a home, and controls the electric power consumption in the corresponding customer 2.

For example, the customer terminal 21 includes a control unit 210, a CPU 211, a memory 212, a communication port 213, a storage device 214, and the user interface unit 215. For example, the control unit 210 includes the CPU 211 and the memory 212.

For example, the storage device 214 stores computer programs for implementing each of the event receiving unit F21, the DR response transmitting unit F22, the report transmitting and receiving unit F23, and the device controlling unit F24.

The event receiving unit F21 is a function for communicating with the event notification unit F13 of the DR server 1. The DR response transmitting unit F22 is a function for issuing a response, indicating whether the customer terminal 21 participates in the event, to the DR response receiving unit F14 of the DR server 1. The report transmitting and receiving unit F23 is a function for transmitting an actually measured value of the electric power consumption and the like to the DR server 1. The report transmitting and receiving unit F23 may display the information received from the DR server 1 through the user interface unit 215. The device controlling unit F24 has a function of controlling an operation of the control target device 22 managed by the customer terminal 21. For example, the device controlling unit F24 can control the starting and stopping of the control target device 22, and change a setting value of the control target device 22.

FIG. 4 schematically illustrates the other tables T12 to T18 stored in the storage device 114 of the DR server 1.

For example, the DR program unit F11 holds a program result table T10, a program result detail table T13, a condition relaxing rule table T14, and a constraint condition table T15. The program result table T10 stores a DR program creation result. The program result detail table T13 stores a detail of the DR program creation result. The condition relaxing rule table T14 stores a rule for relaxing a constraint condition for re-creating the DR program. The constraint condition table T15 stores the constraint conditions that need to be satisfied by the DR program. Not all the tables T10 to T18 need to be used in all the embodiments. For example, the constraint condition table T15 and the condition relaxing rule table T14 are not used in the first embodiment, but are used in second and third embodiments.

For example, the adjustment feasible amount predicting unit F12 holds an adjustment amount history table T16, a weather information table T17, and a calendar information table T18.

The adjustment amount history table T16 manages the history of the adjustment amounts, achieved by each customer terminal 21, associated with date and time or a weather condition. The weather information table T17 stores past, current, and future weather information acquired. The calendar information table T18 is used to identify whether the day the DR program was executed was a weekday or a weekend. The adjustment feasible amount predicting unit F12 may use a table for managing information related to various events (events other than the DR event) such as a concert and an international conference, in addition to the tables T16 to T18.

FIG. 5 illustrates an initial state of the customer table T11. For example, this customer table T11(1) manages a customer terminal ID C110 and a customer terminal address C111. A case where three customer terminals 21 are managed is described below as an example. However, this should not be construed in a limiting sense, and the DR server 1 can manage one, two, or four or more customer terminals 21.

The customer terminal ID C110 is information for uniquely identifying each customer terminal 21 in the electric power demand adjustment program management system. In FIG. 5, the three customer terminals 21 are each provided with IDs "CSTMR1", "CSTMR2", and "CSTMR3". The customer terminal address C111 is a network address used for communicating with each customer terminal 21.

FIG. 6 is a sequence diagram illustrating DR event notification processing. The DR event is sometimes abbreviated as an event in the description below. The event notification unit F13 of the DR server 1 notifies the event receiving unit F21 of the customer terminal 21 of the event (S11).

Upon receiving the event from the DR server 1, the event receiving unit F21 of the customer terminal 21 notifies the event notification unit F13 of the successful reception (S12).

The event table T10, illustrating one example of the event information notified from the DR server 1 to the customer terminal 21, is illustrated in a lower part of FIG. 6.

For example, the event table T10 manages an event ID C100, an event date C101, an event time block C102, and a detail C103 that are associated with each other.

The event ID C100 is information for uniquely identifying an event. The event date C101 is information indicating the date of the event. The event time block C102 is information indicating a time block in which the event is executed on the date of the event. The detail C103 is information indicating the detail of the event.

FIG. 6 illustrates an example where the event ID C100 is "Event 1", the event date C101 is "Dec. 31, 2015", and the event time block C102 is "09:00 to 10:30". An address (uniform resource locator (URL)) of a page in which a method of calculating an incentive price is written and the like is described in the detail C103.

FIG. 7 is a diagram illustrating a sequence for the DR response. When participating in the event, the DR response transmitting unit F22 of the customer terminal 21 notifies the DR response receiving unit F14 of the DR server 1 of the DR response (S21). Upon receiving the DR response from the customer terminal 21, the DR response receiving unit F14 of the DR server 1 notifies the DR response transmitting unit F22 of the customer terminal 21 of the successful reception (S22).

One example of information T21 notified through the DR response is illustrated in a lower part of FIG. 7. For example, the information T21 notified through the DR response includes a customer terminal ID C210, an event ID C211, and a response C212.

A value that is the same as that used for the customer terminal ID in the customer table T11 is used for the customer terminal ID C210. A value that is the same as that used for the event ID in the event table T10 is used for the event ID C211. The response C212 stores information indicating whether the customer terminal 21 participates in the event. In the example illustrated in FIG. 7, "CSTMR1", "Event 1", and "participate" are respectively stored as the customer terminal ID, the event ID, and the response.

FIG. 8 is a diagram illustrating a sequence of report information notification processing. Here, a case is described where the customer terminal 21 notifies the DR server 1 of the report information. Alternatively, the DR server 1 may notify the customer terminal 21 of the report information.

The report transmitting and receiving unit F23 of the customer terminal 21 notifies the report transmitting and receiving unit F15 of the DR server 1 of the report information (S31). Upon receiving the report information, the report transmitting and receiving unit F15 of the DR server 1 notifies the report transmitting and receiving unit F23 of the customer terminal 21 of the successful reception (S32).

The report transmitting and receiving unit F23 of the customer terminal 21 waits for a predetermined period of time to periodically transmit the report information to the DR server 1 (S33). When the predetermined period of time elapses, the report transmitting and receiving unit F23 returns to step 331 and repeats the processing in steps S31 to S33 described above. The report information T21 and the report information T22, transmitted from the customer terminal 21 to the DR server 1, are described below with reference to FIGS. 12 and 13.

An example of the DR program is described with reference to FIG. 9. In the DR program, the target adjustment amount is set for each period as the predetermined time segment, that is, for each predetermined time block. The target adjustment amount in each period is achieved by at least one customer terminal 21 (a plurality of customer terminals 21 in a normal situation).

The target adjustment amount in each period is illustrated in an upper part of FIG. 9. The target adjustment amount in a period from 9:00 is 30 Wh. The target adjustment amount in a period from 9:30 is 40 Wh. The target adjustment amount in a period from 10:00 is 40 Wh. The specific numerical values and the units of the adjustment amount are merely an example for better understanding. The scope of the present invention is not limited to any specific numerical value and a unit including other examples described below.

A graph illustrating allocation of the target adjustment amount to the customer terminals 21 in each period is illustrated in a lower part of FIG. 9. Three customer terminals 21 (CSTMR1, CSTMR2, and CDTMR3) participate in the DR program. The program result table T12 and the program result detail table T13, described later with reference to FIG. 18, are created based on the example illustrated in FIG. 9.

A bold dotted line in FIG. 9 represents the target adjustment amount of the main program. A bold dotted chain line in FIG. 9 represents the target adjustment amount of the supplementary program. The target adjustment amount of the supplementary program is set to be smaller than the target adjustment amount of the main program as illustrated in FIG. 9. Although not elaborated in the figure, the supplementary program is implemented by the other customer terminals 21 that do not participate in the main program. The supplementary program is created as a scaled down version of the main program, based on the ratio between the target adjustment amount of the supplementary program and the target adjustment amount of the main program.

In the period from 9:00 with the target adjustment amount of 30 Wh, the customer terminal 21 (CSTMR2) is allocated with 20 Wh, the customer terminal 21 (CSTMR1) is allocated with 10 Wh, and the customer terminal 21 (CSTMR3) is allocated with no adjustment amount.

In the period from 9:30 with the target adjustment amount of 40 Wh, the customer terminal 21 (CSTMR1) is allocated with 10 Wh, the customer terminal 21 (CSTMR2) is allocated with 20 Wh, and the customer terminal 21 (CSTMR3) is allocated with 10 Wh.

In the period from 10:00 with the target adjustment amount of 40 Wh, the customer terminal 21 (CSTMR3) is allocated with 20 Wh, the customer terminal 21 (CSTMR2) is allocated with 10 Wh, and the customer terminal 21 (CSTMR1) is allocated with 10 Wh.

FIG. 10 is a diagram illustrating a relationship between the customer terminals 21 participating in the main program and the customer terminals 21 participating in the supplementary program. First, a group of customer terminals (#1 to #6) participating in the supplementary program is selected from a group of customer terminals managed by the DR server 1. Then, a group of customer terminals (#11 to #18) participating in the main program is selected from the remaining ones of the group of customer terminals.

As described above, the customer terminals participating in the supplementary program are first selected, and then the customer terminals participating in the main program are selected. The target adjustment amount of the supplementary program is set to be smaller than the target adjustment amount of the main program (from a few to less than 20% for example). Thus, the number of customer terminals required in the supplementary program is smaller than the number of customer terminals required in the main program. The supplementary program is created in preparation for a case where the customer terminal that has been scheduled to participate in the main program suddenly withdraws from the program (opt-out). Thus, a reliable customer terminal should participate in the supplementary program. This can be achieved by using different types of prioritization for the main program and for the supplementary program. For example, the prioritization for the main program is set to achieve a lower overall cost, and the prioritization for the supplementary program is set to include more customers with a record of opting out. The customers participating in the supplementary program are distinguished from the customers participating in the main program so that each customer is dedicated to the participating program, whereby the DR can be executed with a higher reliability. This can be achieved by selecting the customer participating in the main program from the customers not participating in the supplementary program.

Thus, in the present embodiment, the group of customer terminals participating in the supplementary program is first selected from the group of managed customer terminals, and then the group of customer terminals participating in the main program is selected from the remaining ones of the managed customer terminals. Thus, a highly reliable supplementary program can be prepared to be ready for a sudden change in the main program. As in the embodiment described below, the re-creation of the main program can be facilitated by gradually reducing the number of customer terminals that are scheduled to participate in the supplementary program. A dotted line in FIG. 10 illustrates how the customer terminal 21 (#2) is transferred from the supplementary program to the main program.

FIG. 11 illustrates an example of a customer table T11(2) obtained by registering a capability to participate in the event. The customer table T11(2) is obtained by adding information C112, indicating the capability to participate in the event identified by the event ID, to the customer table T11(1) in the initial state illustrated, in FIG. 5. Upon receiving a DR response T21 from the customer terminal 21 wishing to participate in the event through the processing described, with reference to FIG. 7, the DR server 1 registers the capability of the customer terminal 21 to participate in the event in the customer table T11.

FIG. 12 illustrates an example of first report information T21. The first report information T21 is transmitted from the report transmitting and receiving unit. F23 of the customer terminal 21 to the report transmitting and receiving unit F15 of the DR server 1 through the processing described with reference to FIG. 8.

The first report information T21 holds information required for the DR server 1 to establish the DR program. For example, the first report information T21 includes the customer terminal ID C210, the event ID C211, a maximum duration C212, a minimum duration C213, a minimum downtime C214, smallest acceptable adjustment values C215A to C215C of respective periods, and maximum, adjustable values C216A to C216C of respective periods.

The customer terminal ID C210 and the event ID C211 are the same as those described above, and thus the description thereof will be omitted.

The maximum duration C212 is a value reported from each customer terminal 21 and represents a maximum period of time during which the customer terminal 21 can continuously execute the demand adjustment. The maximum duration is a value depending on the capacity of the customer. The time and the period of time are represented by the number of periods.

The minimum duration C213 is a value reported from each customer terminal 21 and represents a shortest time acceptable for the customer terminal 21 willing to participate in the program. Thus, the value also represents a condition of the customer under which the customer does not participate in the DR program if the customer cannot participate in executing the demand adjustment at least for the minimum duration C213. This is because the customer executing the demand adjustment for a shorter period of time is usually given a smaller incentive.

The minimum downtime C214 is a value reported from each customer terminal 21, and represents a downtime required before the demand adjustment is executed that depends on the capacity of the customer. For example, when the demand is adjusted by stopping the air conditioner during daytime in summer, the temperature that has risen during then needs to be lowered. About how long the air conditioner needs to be operated depends on the capacity of the air conditioner and the heat insulation performance of the corresponding building.

The smallest acceptable adjustment values C215A to C215C of respective periods are values reported from each customer terminal 21. Each customer terminal 21 can report different values, as the smallest acceptable adjustment values, for respective periods to the DR server 1. The smallest acceptable adjustment value represents a smallest acceptable demand adjustment amount for the customer terminal 21. The customer achieving a smaller demand adjustment amount is usually given a smaller incentive.

The maximum adjustable values C216A to C216C of respective periods are values reported from each customer terminal 21. Each customer terminal 21 can report different values, as the maximum adjustable value, for respective periods to the DR server 1. The maximum adjustable value is a maximum achievable value of the demand adjustment amount of the customer terminal 21 and depends on the capacity of the customer.

FIG. 13 illustrates an example of second report information T22. The second report information T22 is periodically transmitted from the customer terminal 21 to the DR server 1 through the processing described with reference to FIG. 8.

For example, the second report information T22 holds a customer terminal ID C220, a date C221, a time block C222, and a consumption amount C223.

The date C221 indicates the created date of the second report information T22. The time block C222 indicates a time block during which the electrical power consumption amount has been measured. The consumption amount C223 indicates a sum of the amounts of electric power consumed by the control target devices 22 managed by the customer terminal 21.

FIG. 13 illustrates the second report information T22 that has been transmitted from the customer terminal (CSTMR1) to the DR server 1 at "2015/1/1/01:00" and indicates that the amount of electric power consumed in the time block (00:30-01:00) is 100 Wh.

An amount obtained by subtracting a baseline amount from the electric power consumption amount (electricity consumption amount) is an actually measured value of an adjustment amount to be registered in the adjustment amount history table T16. The baseline amount is a value serving as a basis for calculating the actual value of the demand adjustment, and is set to be "electric power consumption amount in the last three months" for example. The adjustment amount history table T16, which is not illustrated in the figure, is a table storing the actual value of the adjustment amount for each customer terminal ID and for each time block.

Each customer terminal 21 may transmit the second report information T22 to the DR server 1 at any appropriate timing. For example, the customer terminal 21 may transmit the second report information T22 to the DR server 1 once in every predetermined time, or upon being instructed to transmit the information by the customer.

FIG. 14 illustrates an example of a customer table T11(3) obtained by registering the capability to participate in the event and the content of the first report information T21. The customer table T11(3) illustrated in FIG. 14 is obtained by adding contents C113 to C117 of the first report information T21 to the customer table T11(2) illustrated in FIG. 11.

More specifically, the customer table T11(3) includes a maximum, duration C113, a minimum duration C114, a minimum downtime C115, smallest acceptable adjustment values C116A to C116C, and maximum adjustable values C117A to C117C as additionally registered items. The items C113 to C117 are as described above.ABbreviated terms such, as Dumax, Dumin, Dtmin, Awmin, and Awmax may be respectively used for the maximum duration, the minimum duration, the minimum downtime, the smallest acceptable adjustment value, and the maximum adjustable value, as appropriate for simplifying the illustration.

FIG. 15 is a table T19 illustrating an example of the adjustable amount processed by the adjustment feasible amount predicting unit F12. This adjustable amount defining table T19 illustrated, in FIG. 15 is a table used for describing the types of the adjustable amount. The adjustment feasible amount predicting unit F12 needs not to actually hold the adjustable amount defining table T19.

The types of the adjustable amount include the maximum adjustable value (Awmax), a predicted adjustable amount (Awp), and a final predicted adjustable amount (Awfp) as illustrated in the figure as items C190 to C192.

The adjustment feasible amount predicting unit F12 predicts the predicted adjustable amount as the feasible adjustment amount of each customer, by referring to the adjustment amount history table T16, the weather information table T17, and the calendar information table T18, based on the event date, the event time block, and the customer terminal ID, for example.

The adjustment feasible amount predicting unit F12 employs a smaller one of the maximum adjustable value reported from each customer terminal 21 and the predicted adjustable amount. This is because the maximum adjustable value is a value reported from the customer terminal 21 and thus is not necessarily a reliable value.

Thus, the adjustment feasible amount predicting unit F12 employs a smaller one of the maximum adjustable value, which is a reported value, and the predicted adjustable amount, which is a predicted value, as the feasible final predicted adjustable amount of the customer terminal 21, to achieve higher accuracy of the DR program and a low risk of the DR program ending in a failure.

FIG. 16 illustrates an example of a customer table T11(4) obtained by registering the capability to participate in the event, the contents of the first report information T21, and the prediction result of the adjustment feasible amount predicting unit F12. The customer table T11(4) illustrated in FIG. 16 is obtained by adding items C118A to C118C and items C119A to C119C to the customer table T11(3) illustrated in FIG. 14. The items C118A to C118C each represent the predicted adjustable amount (Awp) in a corresponding period. The items C119A to C119C each represent the final predicted adjustable amount (Awfp) in a corresponding period.

As illustrated in a right part in the customer table T11(4), the smallest acceptable adjustment value (Awmin) of the customer terminal 21 (CSTMR3) in the period starting from 9:30 is set to "310" that is a value relatively larger than other values. This indicates that the customer terminal 21 (CSTMR3) desires to adjust the demand at least by 310 Wh in the period from 9:30. However, whether the requested adjustment (Awmin 310 Wh from 9:30) is acceptable is yet to be known at this point.

The final predicted adjustable amount (Awfp) of the customer terminal 21 (CSTMR3) in the period from 9:00 is set to "0.01" that is smaller than other values. This indicates that the smaller one of the maximum adjustable value (Awmax) reported by the customer terminal 21 (CSTMR3) and the predicted adjustable amount (Awp) predicted by the adjustment feasible amount predicting unit F12 is "0.01".

FIG. 17 illustrates an example of a customer table T11(5) obtained by registering the capability to participate in the event, the contents of the first report information T21, and the prediction result of the adjustment feasible amount predicting unit F12. The customer table T11(5) illustrated in FIG. 17 is obtained by partially changing the values of items C110 to C119 in the customer table T11(4) illustrated in FIG. 16.

More specifically, as illustrated in the right part of the customer table T11(5) the smallest acceptable adjustment value (Awmin) of the customer terminal 21 (CSTMR3) in the period from 9:30 has been changed from "310" in FIG. 16 to "10".

As described in an embodiment described later, the DR server 1 can generate the DR program satisfying all the constraint conditions by gradually relaxing the value based on a request of the customer terminal in the values reported from the customer terminal 21.

The DR server 1 needs to acquire the following information to create the DR program. For example, the information required for creating the program includes: the target adjustment amount; the minimum, duration; the maximum duration; the minimum downtime; the smallest acceptable adjustment value; the final predicted adjustable amount; and the supplementary adjustment ratio. These items, except for the target adjustment amount and the supplementary adjustment ratio, need to be set for each customer terminal 21. More specifically, the minimum duration, the maximum duration, the minimum downtime, the smallest acceptable adjustment value, and the final predicted adjustable amount are set for each customer terminal 21. A value requested by the aggregator and the electric power supplier is used as the target adjustment amount. A value requested by the user is used as the supplementary adjustment ratio. The user can set an amount supplemented under the supplementary program to be large in a required case so that a higher feasibility of the main program can be achieved.

FIG. 18 illustrates an example of the program result table T12 and the program result detail table T13 in a case where the DR program has been successfully created. Upon successfully creating the DR program (including the main program and the supplementary program) satisfying all the constraint conditions, the DR program unit F11 of the DR server 1 outputs the tables T12 and T13 illustrated in FIG. 18. The DR server 1 can provide the tables T12 and T13 to the user through the user interface unit 115. The DR server 1 may transmit a part or all of the tables T11 and T12 to the customer terminal 21 participating in the DR program depending on a content of a contract and the like.

For example, the program result table T12 in the case where the DR program has been successfully created includes a record number C120, a request ID C121, and a success/failure flag C122.

The record number C120 is identification information uniquely provided to each record. The request ID C121 is a value uniquely provided to each DR program. The success/failure flag C122 is information indicating whether the DR program identified by the request ID has been successfully created, and is set to "1" when the program is successfully created, and is set to "0" when the creation of the DR program fails as described later with reference to FIG. 19.

The program result detail table T13 illustrates a detail of the DR program that has been successfully created. For example, the program result detail table T13 includes a request ID C130, an adjustment target period C131, an adjustment amount C132 allocated to each customer terminal in each period, and a main program flag C133. The program result detail table T13 illustrated in FIG. 18 has been created based on the DR program illustrated in FIG. 9.

The adjustment target period C131 indicates a time block in which the electric power demand is adjusted. The adjustment amount C132 of each customer terminal indicates IDs of the customer terminals 21 participating in the demand adjustment and an adjustment amount allocated to the each of the customer terminals 21 in each adjustment target period. The main program flag C133 indicates whether the program is the main program or the supplementary program, and is set to "True" for the main program and to "False" for the supplementary program.

Here, the main program flag C133 is all set to "True" so that the rate of the adjustment with the supplementary program is 0%, for the sake of description. The supplementary program thus omitted herein can be created in the manner similar to that for the main program. Thus, a person skilled in the art can easily understand a method of creating the supplementary program based on the description on how the main program is created, and thus can implement the present invention.

If the supplementary adjustment ratio is set to a positive value, and thus there is the customer terminal 21 allocated with the adjustment amount according to the supplementary program, a record with the main program flag set to "False" is also registered in the program result detail table T13.

FIG. 19 illustrates an example of the program result table T12 and the program result detail table T13 in a case where the creation of the DR program has ended in a failure. When the DR program unit F11 fails to satisfy any one of the constraint conditions, the creation of the DR program (including the main program and the supplementary program) ends in a failure. Upon failing to create the DR program, the DR program unit F11 outputs the tables T12 and T13 illustrated in FIG. 19. The DR server 1 can provide the tables T12 and T13 to the user through the user interface unit 115.

The program result table T12 in the case where the creation of the DR program has ended in a failure further includes a failed period number C123, a failed constraint condition C124, and a failed customer terminal C125, in addition to the record number C120, the request ID C121, and the success/failure flag C122. Thus, the program result table T12 in FIG. 19 illustrates an overview of the cause of the failure to create the DR program.

The failed period number C123 is information for identifying a period when it has been determined that the creation of the DR program has ended in a failure. The failed constraint condition C124 is information for identifying the constraint condition that has not been satisfied when it has been determined that the creation of the DR program has ended in a failure. The failed customer terminal C125 is information for identifying the customer terminal 21 related to the constraint condition that has not been satisfied when it has been determined that the creation of the DR program has ended in a failure. The failed customer terminal is a customer terminal for which the constraint condition has been failed to be satisfied, and can also be referred to as a failed constraint target customer terminal.

The example illustrated in FIG. 19 indicates that the failure has occurred for the third customer with respect to the fifth constraint condition to be described later with reference to FIG. 20 in the second period.

The value of the failed customer terminal C125 indicates an order in which the information of the customer terminals 21 is input when the DR program is created. For example, when the terminal IDs CSTMR1, CSTMR2, and CSTMR3 are input in this order, the failed customer terminal C125 set to "3" indicates that the failure related to the customer terminal 21 having the third input terminal ID (CSTMR3) has occurred.

The failed customer terminal C125 is set only when a "True" is stored as a customer based constraint flag C152 in a constraint condition table T15 described later with reference to FIG. 20.

In the present embodiment, the failed period number C123, the failed constraint condition C124, and the failed customer terminal C125 in the program result table T12 are provided to the user through the user interface unit 115 to facilitate the re-creation of the program by the user.

The program result detail table T13 in FIG. 19 illustrates a cause of the failure to create the DR program in detail. The program result detail table T13 includes a request ID C130, an adjustment target period C131, an evaluation of each customer terminal C132A, and a main program flag C133.

The program result detail table T13 illustrated in FIG. 19 is obtained by replacing the adjustment amount C132 of each customer terminal in the program result detail table T13 illustrated in FIG. 18 with the evaluation C132A of each customer terminal.

The evaluation C132 is information for clearly notifying the user of data (inappropriate data) with a negative value. When it has been determined that the creation of the DR program (REQ3) has ended in a failure as indicated by the request ID C130, the DR program unit F11 identifies the customer terminal 21 that has reported the data (inappropriate data) not appropriate for creating the program, with the evaluation C132A.

The evaluation C132A is set to "−2", indicating "NG", when any one of inappropriate conditions 1 and 2 described below is satisfied, and is set to "−1", indicating "OK", when none of the inappropriate conditions 1 and 2 is satisfied.
(Inappropriate condition 1): The smallest acceptable adjustment value exceeds the final predicted adjustable amount.
(Inappropriate condition 2): The final predicted adjustable amount is smaller than a predetermined amount (for example, 1 Wh).

The program result detail table T13 illustrated in FIG. 19 illustrates an example where the contents of the customer table T11(4), illustrated in FIG. 16, are input to the DR server 1. The customer terminal ID (CSTMR3) in FIG. 16 corresponds to "310" as the smallest acceptable adjustment value (Awmin) in the period from 9:30, and "20" as the final predicted adjustable amount (Awfp) in the same period. Thus, the inappropriate condition 1 is satisfied, whereby the evaluation of the customer terminal ID (CSTMR3) in the period from 9:30 is set to "−2".

Similarly, the customer terminal ID (CSTMR3) in FIG. 16 corresponds to "0.01" as the final predicted adjustable amount (Awfp) in the period from 9:00 that is smaller than the predetermined amount "1 Wh". Thus, the inappropriate condition 2 is satisfied, whereby the evaluation of the customer terminal ID (CSTMR3) in the period from 9:00 is set to "−2".

The evaluation of the customer terminal ID (CSTMR3) in the period from 10:00 is set to evaluation "−1" because none of the inappropriate conditions is satisfied. The evaluation of the customer IDs (CSTMR1) and (CSTMR2) is set to evaluation "−1" for all the periods, because none of the inappropriate conditions is satisfied.

FIG. 20 illustrates an example of the constraint condition table 115 for managing the constraint condition. For example, the constraint condition table T15 includes a condition number C150, a detail C151, and the constraint flag for each customer C152.

The condition number C150 is information for uniquely identifying the constraint condition. The detail C151 indicates the detail of the constraint condition. The constraint flag for each customer C152 is a flag indicating whether the constraint condition is set for each customer terminal 21 (True), or only one constraint condition is set for all the customer terminals 21 (False).

The present invention uses the following five exemplary constraint conditions.

(Constraint condition 1) The sum of the adjustment amount upper limit values of the customer terminals is equal to or larger than a target value.

(Constraint condition 2) The duration of each customer terminal is equal to or shorter than the maximum duration.

(Constraint condition 3) The duration of each customer terminal is equal to or longer than the minimum duration.

(Constraint condition 4) The minimum downtime of each customer terminal can be ensured.

(Constraint condition 5) An adjustment amount that equal to or larger than the smallest acceptable adjustment value is allocated to each customer terminal.

FIG. 21 is a flowchart illustrating processing of creating the DR program. Here, the processing, which is mainly executed by the DR program, unit F11, is described with the DR server 1 as the subject of operations.

First of all, the DR server 1 executes repeating processing for each period (S101). The DR server 1 generates state transition satisfying the constraint conditions (S102).

More specifically, the DR server 1 extracts all the combinations between the customer terminals 21 executing and not executing the demand adjustment, and generates the combination satisfying all the constraint conditions illustrated in FIG. 20 (S102). In FIG. 21, such a combination is referred to as the state transition.

The DR server 1 determines whether all the combinations (state transition) satisfying the constraint conditions include the solution (S103). When there is the solution (S103: YES), the DR server 1 allocates adjustment amounts to the customer terminals scheduled to participate in the DR program (S104).

The DR server 1 allocates the adjustment amounts in such a manner that each of the customer terminals scheduled to participate in the DR program is allocated with the smallest acceptable adjustment amount or more, and in such a manner that the target adjustment amount is achieved by the sum of the adjustment amounts allocated to the customer terminals scheduled to participate in the DR program. The DR server 1 may set priorities to the customer terminals 21 and allocate the adjustment amounts while taking the priorities into consideration. For example, the adjustment amounts may be allocated in the order of reliability calculated for each customer terminal based on a record of participating in the DR program. Alternatively, the adjustment amounts may be allocated in the order of reliability given higher priority set to the customer terminal 21 that has accepted an adverse condition in a DR program that has been performed before, to compensate for the loss at that time.

The DR server 1 stores the result of allocating the adjustment amount in step S104 as an internal variable that can be a value for each period, and performs an update with the values corresponding to the currently processed period number. In the initial processing, the values are not updated, but are newly generated.

When the repeated processing for each period is terminated (S106), the DR server 1 prioritizes the state transitions, and determines the state transition with the highest priority as the final solution (S107). For example, the DR server 1 prioritizes the state transitions in such a manner that a state transition corresponding to a smaller product of the allocated adjustment amount and an electric power purchase unit price has a higher priority, and selects the one with the highest priority as the solution.

The DR server 1 determines whether both the main program and the supplementary program have been created (S108). When both the main program and the supplementary program have been created (S108: YES), the processing is terminated. When any one of the main program and the supplementary program have not been created (S108: NO), the DR server 1 switches the program to be created (S109), and returns to step S101. When the supplementary program has been first created, the program to be created is switched to the main program, and when the main program, has been first created, the program to be created is switched to the supplementary program.

The supplementary program is created by using the target adjustment amount of the supplementary program calculated from the target adjustment amount of the main program and the supplementary adjustment ratio.

Upon determining that there is no solution in step S103 (S103: NO), the DR server 1 identifies the number of the period in which no solution has been found (S110). Furthermore, the DR server 1 identifies the constraint condition information including the constraint condition and the customer terminal which have been determined to have no solution (S111). More specifically, information including the failed constraint condition and the failed customer terminal is identified. As described above, only when the constraint condition is set to each customer terminal, the customer terminal for which the constraint condition cannot be satisfied is identified.

The DR server 1 investigates whether there is the insufficient data inappropriate for the creation of the DR program based on the information identified in step S111 (S112). The DR server 1 provides the investigation result obtained in step S112 to the user in a form of the investigation result table T12 and the Investigation result detail table T13 described with reference to FIG. 19. The result of investigating the cause of the failure can be provided to the user in a form other than the form of the tables illustrated in FIG. 19.

In the present embodiment, when the creation of the DR program ends in a failure, the DR server 1 investigates the cause of the failure, and provides the investigation result to the user in the form of the tables T12 and T13. Thus, the user can re-create a new DR program while recognizing the cause of the failure by referring to the tables T12 and T13. As a result, the DR program can be created in a shorter period of time, whereby higher operation efficiency can be achieved.

In the present embodiment, when the creation of the DR program ends in a failure, the DR server 1 investigates whether there is the insufficient data inappropriate for creating the DR program in the first place, and provides the checking result to the user. Thus, the user can quickly recognize the specific cause of the failure.

In the present embodiment, a smaller one of the maximum adjustable value, reported from the customer terminal 21, and the predicted adjustable amount, predicted by the adjustment feasible amount predicting unit F12 based on the past record and the like is employed. Thus, a realistic DR program that is likely to be feasible can be created, whereby the DR server 1 with a higher reliability can be achieved.

Second Embodiment

A second embodiment is described with reference to FIGS. 22 to 24. The embodiments described below including the present embodiment are modifications of the first embodiment, and thus are described while focusing on the difference from the first embodiment. In the present embodiment, when the creation of the DR program ends in a failure, an attempt to re-create a DR program is made by gradually relaxing a predetermined constraint condition set in advance.

As described above, to create the DR program, the DR server 1 needs to acquire the minimum duration, the maximum duration, the minimum downtime, the smallest acceptable adjustment value, the final predicted adjustable amount, the supplementary adjustment ratio, and the like in addition to the target adjustment amount.

The minimum duration, the smallest acceptable adjustment value, and the supplementary adjustment ratio in these pieces of information are values set in accordance with a request from the customer or the user (requested value). The maximum duration, the minimum, downtime, and the final predicted adjustable amount are values depending on the capacity on the customer side (capacity value). Generally, the performance value is more difficult to change than the request value, and thus the request value is easier to change than the capacity value.

FIG. 22 illustrates an example of a condition relaxing rule table T14 used for re-creating the DR program. The re-creating of the DR program may be hereinafter referred to as re-planning.

For example, the condition relaxing rule table T14 includes a condition number C140, a relaxing condition name C141, a relaxing order C142, and a relaxing value C143.

The condition number C140 is information for identifying the relaxed condition. The relaxing condition name C141 is information indicating the content of the relaxed condition. The relaxing order C142 is information defining the order of the conditions to be relaxed when there are plurality of relaxed conditions. The relaxing value C143 is an amount by which the relaxed condition is relaxed each time.

The condition relaxing rule table T14 may be set by a vendor of the DR server 1 or by the user of the DR server 1 when the DR server 1 is shipped or installed. For example, the user registers the condition related to the request value to the condition relaxing rule table T14. This is because the condition related to the requested value can be relaxed more easily than the condition related to the capacity value, and thus is suitable for the re-planning processing. The user can set the relaxed order and the relaxing value to desired values.

In an example illustrated in FIG. 22, the predetermined conditions that can be relaxed include the smallest acceptable adjustment value, the minimum duration, and the supplementary adjustment ratio that are respectively provided with the highest, second highest, and lowest priorities. The priorities are set in this way because the smallest acceptable adjustment value and the minimum duration are value that do not depend on the capacity of the customer side and is a value requested by the customer that can be easily changed by a permission from the customer (permission from the customer terminal 21).

The supplementary adjustment ratio is also a user request value that can be easily changed. On the other hand, the supplementary adjustment ratio defines a capacity of the supplementary program to support the main program, and thus is provided with the lowest order to maintain the high reliability of the DR program. Alternatively, the user can individually determine and set the conditions to be relaxed and the order of the relaxed conditions. As described above, the user can freely set the condition relaxing rule table T14, and thus can enjoy higher usability.

FIG. 23 illustrates an example of the program result table T12A. The program result table T12A of this embodiment includes the record number C120, the request ID C121, the success/failure flag C122, the failed period number C123, the failed constraint condition C124, and the failed customer terminal C125 as in the case of the program result table T12 illustrated in FIG. 19, and further includes a relaxed condition flag C126.

The relaxed condition flag C126 is information indicating actually relaxed one of the predetermined conditions (the smallest acceptable adjustment value, the minimum duration, and the supplementary adjustment ratio), and is set to "1" for the actually relaxed condition, and is set to "0" for the condition that has not been relaxed.

The relaxed condition flag C126, which may be in any appropriate form, is illustrated in a form of a matrix in this embodiment. In the matrix, the customer terminals are arranged in the row direction, and the predetermined conditions to be relaxed is arranged in the column direction.

FIG. 23 illustrates a table with the record of the request ID "REQ2" corresponding to that in the customer table T11(5) illustrated in FIG. 17, the target adjustment amount corresponding to an example illustrated with reference to FIG. 9, and the record of the request ID "REQ3" corresponding to that in the customer table T11(4) illustrated in FIG. 16. The creation of the DR program based on the customer table T11(4) illustrated in FIG. 16 fails because "310" as the smallest acceptable adjustment value (Awmin) corresponding to the customer terminal ID (CSTMR3) in the period from 9:30 is too large.

Thus, the DR server 1 reduces the "smallest acceptable adjustment value" with the highest relaxed order by "300 Wh" in accordance with the condition relaxing rule table T14 illustrated in FIG. 22. Thus, the smallest acceptable adjustment value (Awmin) is reduced from "310" to "10". As a result, the DR server 1 can obtain the customer table T11(5) illustrated in FIG. 17 by relaxing one condition, and thus can successfully create the DR program.

The record of the "REQ4" corresponds to an example where the target adjustment amount in the period from 9:00 is higher than the target adjustment amount illustrated in FIG. 9 by 10 Wh, in the case of the customer table T11(4) illustrated in FIG. 16. More specifically, the target adjustment amount in the period from 9:00, which is set to "30 Wh" in FIG. 9, is set to "40 Wh" in the example illustrated in FIG. 23. As illustrated in a lower side of the table T11(4) in FIG. 16, the final predicted adjustable amounts (Awfp) in the period from 9:00 of the customer terminal (CSTMR1), the customer terminal (CSTMR2), and the customer terminal (CSTMR3) are "10 Wh", "20 Wh", and "0.01 Wh", respectively. Thus, thus sum of the adjustable amounts of all the customer terminals (CSTMR1 to 3) participating in the DR program in the period from 9:00 is "30.01 Wh" and thus the target adjustment amount "40 Wh" is not achieved.

Thus, the DR program corresponding to the "REQ4" cannot achieve the target adjustment amount, even when all the relaxed conditions illustrated in FIG. 22 are relaxed as much as possible, and thus is determined as a failure. All the values in the matrix of the relaxed condition flag for the DR program of the "REQ4" set to 1 indicating that the re-planning has been performed by relaxing all the relaxed conditions as much as possible. Here, for the sake of simpler explanation, the supplementary adjustment ratio in the present embodiment is set to 0%.

FIG. 24 is a flowchart illustrating program creating processing according to the present embodiment. The processing includes all steps S101 to S112 described in FIG. 21. Furthermore, in the processing, upon determining that the results obtained in step S102 do not include the solution (S103: NO), the DR server 1 determines whether the constraint condition can be relaxed (S120). As described above, the DR server 1 relaxes at least one of the conditions that can be relaxed set in advance to relax the constraint condition corresponding to the relaxed condition.

Upon determining that the constraint condition can be relaxed (S120: YES), the DR server 1 relaxes the predetermined condition to relax the constraint condition (S121), and then returns to step S101. On the other hand, for example, upon determining that the constraint condition cannot be relaxed any further because all the conditions that can be relaxed have been relaxed as much as possible (S120: NO), the DR server 1 creates the program result detail table T13 in steps S110 to S112, and provides the table to the user.

The present embodiment with the configuration described above can provide the same advantageous effects as the first embodiment. Furthermore, in the present embodiment, the attempt to re-create the DR program by relaxing the constraint condition can be made, by gradually relaxing the predetermined condition for relaxing the constraint condition. Thus, the user can implement automatic or semi-automatic creation of a new program, whereby the DR program can be created in a shorter period of time compared with the case of the first embodiment, whereby a higher efficiency can be achieved.

Third Embodiment

A third embodiment is described with reference to FIGS. 25 and 26. In the present embodiment, by eliminating a state where there is no solution when the DR program is re-created, the processing of creating the DR program can be prevented from stopping.

FIG. 25 illustrates an example of a program result table T12B and a program result detail table T13B of the present embodiment. The program result table T12B illustrated in FIG. 25 includes the record number C120, the request ID C121, and the success/failure flag C122 as in the case of the program result table T12 illustrated in FIG. 18, and further includes a relaxed condition flag C126 and a customer terminal adding flag C127. The customer terminal adding flag C127 indicates whether the virtual customer terminal is added (True) or not added (False) when the DR program is created.

The program result detail table T13B of this embodiment is obtained by adding an item for a virtual customer terminal (VIRTUAL) to the adjustment amount C132 for each customer terminal in the program result detail table T13 illustrated in FIG. 18.

The DR program corresponding to "REQ5" represents an example where the target adjustment amount in the period from 9:00 is larger than the target adjustment amount illustrated in FIG. 9 by "10 Wh", in the case of the customer table T11(4) illustrated in FIG. 16. It is assumed in this example that in the period from 9:00, the customer terminal (CSTMR3) is in the downtime and thus allocation is implemented with no adjustment amount.

As described above, the target adjustment amount in the period from 9:00 is "40 Wh". The adjustable amount of the customer terminal (CSTMR1) that is scheduled to participate in the DR program is "10 Wh", and the adjustable amount of another customer terminal (CSTMR2) is "20 Wh". The third customer terminal (CSTMR3) with the adjustable amount of "0.01 Wh" is allocated with no adjustment amount in the period from 9:00.

Thus, the adjustment amount of "10 Wh" needs to be further allocated in the period from 9:00. Here, the DR program can be successfully created only by introducing a virtual customer terminal, defined as a customer terminal that can eliminate the cause of the failure to create the program, into the DR program.

Still, an actually executable DR program cannot be created with the virtual customer terminal that is nothing more than a virtual entity. Thus, the user searches for a real customer terminal that can replace the virtual customer terminal. More specifically, only a single real customer terminal that participates in the DR program instead of the virtual customer terminal needs to be found. Thus, re-planning can be performed in a shorter period of time compared with a case where the new planning involves all the managed customer terminals 21.

FIG. 26 is a flowchart illustrating program creating processing of this embodiment. This processing includes step S101 to S108 and steps S120 and S121 in the processing described with reference to FIG. 24, but does not include steps S110 to S112 in FIG. 24 because the DR program creation theoretically never fails in the processing.

The processing further includes steps S130, S131, and S132. Upon determining that the constraint condition cannot be relaxed (S120: NO), the DR server 1 determines whether the virtual customer terminal has been added to the DR program (S130).

When the virtual customer terminal has not been added to the DR program (S130: NO), the DR server 1 adds a virtual customer terminal (VIRTUAL) to the DR program as illustrated in FIG. 25 (S131).

Then, the DR server 1 sets data, required, for the virtual customer terminal (S132), and returns to step S101. The data required for the virtual customer terminal is data for solving the cause of the failure to create the program. For example, when there is a period when the final predicted adjustable amount is insufficient, the shortage is filled by the virtual customer terminal.

Then, the user finds one customer terminal 21 that can substitute the virtual customer terminal from, the group of customer terminals managed by the DR server 1. For example, the user can find the customer terminal that can substitute the virtual customer terminal by offering special high incentive.

The present embodiment with the configuration described above can provide the same advantageous effect as the first and the second embodiments. Furthermore, in the present embodiment, the virtual customer terminal that can theoretically establish the DR program is introduced after the relaxed conditions are relaxed as much as possible (S120: NO) when it is determined that there is no solution (S103: NO). Thus, the DR program can be created in shorter period of time than the re-creation of the DR program involving all the customer terminals because the user only needs to find a single customer terminal that can substitute the virtual customer terminal.

The number of virtual customer terminal is not limited to one. For example, when there are a plurality of periods with shortage in the adjustment amount, the virtual customer terminal may be introduced to each of the periods or a single virtual customer terminal that can theoretically fill the shortage in the adjustment amount in the plurality of periods.

Fourth Embodiment

A fourth embodiment is described with reference to FIG. 27. In the present embodiment, a request for permission is automatically transmitted to the customer terminal for which the condition is relaxed in the second embodiment and the customer terminal that can replace the virtual customer terminal in the third embodiment, and obtains a response. The request can be issued with communications based on OpenADR. The customer terminal for which the condition is relaxed and the customer terminal that can replace the virtual customer terminal are hereinafter referred to as a request target customer terminal.

An example where the constraint condition is relaxed is described. A request notification T31 is transmitted from the event notification unit F13 of the DR server 1 to the request target customer terminal 21 (S141). The customer terminal 21 that has received the request responds to the request (S142).

Upon receiving the response from the request target customer terminal 21, the DR server 1 compares the content of the response with the content of the request (S143). When the content of the response matches the content of the request, that is, when the request target customer terminal 21 has accepted the request from the DR server 1 as it is, the DR program, with the constraint condition relaxed is employed (S144). On the other hand, when the DR server 1 receives the response overwhelming the content of the request from the request target customer terminal 21, the DR server 1 remodifies the DR program, based on the content of the response (S144).

When no response is received from the request target customer terminal 21 within a predetermined period of time, or when the content of the response cannot satisfy the content of the request (when the request is refused), the request notification may be transmitted to another customer terminal, or may be collectively transmitted to a plurality of the customer terminals 21 and the customer terminal that has first accepted the request may be selected.

For example, the request notification T31 includes an event ID C310, an event date C311, an event time block C312, a request content C313, and an incentive C314.

The request content C313 indicates the requested content. For example, the request content clearly indicates a desired changed value for an item such as the smallest acceptable adjustment value that has been reported in advance. More specifically, the value that has been reported as 400 Wh in advance may be requested to be lowered to 100 Wh. In the example illustrated in FIG. 23 described above, the customer CSTMR3 corresponding to the REQ3 is requested to lower the smallest acceptable adjustment value by 300 Wh. The incentive C314 indicating an incentive obtained upon accepting the request.

A method that is similar to that described with reference to FIG. 27 may be applied to a case where the request is issued to the customer terminal that can replace the virtual customer terminal as described in the third embodiment.

The present embodiment can provide the advantageous effects that are the same as those provided by the first to the third embodiments. Furthermore, in the present embodiment, the DR server 1 automatically issues a request to the customer terminal for which the constraint condition is relaxed or the customer terminal that replaces the virtual customer terminal to obtain the response. Thus, the DR program can be created in a shorter period of time and through a less cumbersome procedure, and thus higher usability can be achieved.

The transmission and reception that take place between the event notification unit and the event receiving unit in the appended FIG. 27 may take place between two report transmitting and receiving units. The present invention is not limited to the embodiments described above. A person skilled in the art can make various additions, modifications, and the like without departing from the scope of the present invention. The exemplary configuration described in the embodiments with reference to the appended figured should not be construed in a limiting sense. The configurations and the processing methods in the embodiments can be appropriately modified to without departing from the object of the present invention.

Each component in the report transmitting and receiving unit may be selected and omitted as appropriate and the present invention includes the invention with a configuration as a result of the selecting and omitting. The configurations described in the scope of claims may be combined in a manner that is not clearly described in the scope of claims.

What is claimed is:

1. An electric power demand adjustment apparatus that improves stability of an electrical power grid comprising:
    a server memory that stores a plurality of predetermined constraint conditions and priorities of each of the plurality of predetermined constraint conditions, wherein each of the plurality of predetermined conditions includes a condition to be satisfied to achieve a target adjustment amount;
    a server communication port that is communicatively coupled to a plurality of customer terminals via a first network, wherein the plurality of customer terminals includes a first customer terminal;
    a server processor communicatively coupled to the server communication port, and the server memory;
    wherein each of the plurality of customer terminals includes:
        a customer communication port that is communicatively coupled to the electric power demand adjustment apparatus via the first network and to a plurality of electric power consuming devices and an electric meter via a second network, wherein the electric meter measures an amount of electricity consumed by the plurality of electric power consuming devices,
        a memory, and
        a processor communicatively coupled to the memory and the customer communication port;
    wherein the server processor:
        acquires, using the server communication port, customer side information from the first customer terminal, wherein the customer side information includes the amount of electricity consumed by the plurality of electric power consuming devices measured by the electric meter of the first customer terminal,
        extracts a plurality of combinations of adjustments to a demand amount allocated between the plurality of customer terminals in each predetermined time segment based on the predetermined constraint conditions stored in the server memory and the customer side information acquired,
        creates a single combination satisfying the plurality of predetermined constraint conditions based on the extracted plurality of combinations of adjustments;
            wherein the processor continues to extract the plurality of combinations of adjustments and creates a plurality of single combinations for the predetermined time segment;
        determines, at an end of the predetermined time segment, a final solution from the plurality of single combinations created, wherein the final solution is determined based on set priorities of each of the plurality of customer terminals,
        creates an electric power demand adjustment program according to the final solution, and
        transmits the electric power demand adjustment program to the first customer terminal; and
    wherein the processor of the first customer terminal:
        receives, using the customer communication port, the electric power demand adjustment program, and
        controls, using the customer communication port, the amount of electricity consumed by the plurality of electric power consuming devices according to the electric power demand adjustment program.

2. The electric power demand adjustment apparatus according to claim 1, wherein the server processor further:
    creates a supplementary program that mitigates a change that occurs when the first customer terminal withdraws from the electric power demand adjustment program based on the predetermined constraint conditions stored in the server memory and the customer side information acquired.

3. The electric power demand adjustment apparatus according to claim 2, wherein
    the server memory further stores predetermined relaxing conditions for relaxing the plurality of predetermined constraint conditions.

4. The electric power demand adjustment apparatus according to claim 2, wherein
    the server processor further:
        predicts a feasible demand adjustment amount of each of the plurality of customer terminals, based on a history of a demand adjustment amount, weather information, and calendar information that are included in the customer side information.

5. The electric power demand adjustment apparatus according to claim 1, wherein the processor further determines a failure to create the electric power demand adjustment program and identifying constraint condition information including a constraint condition and at least one of the plurality of customer terminals that have been determined to have no final solution.

6. The electric power demand adjustment apparatus according to claim 5, wherein the server memory further stores a cause of the server processor failing to create the electric power demand adjustment program.

7. The electric power demand adjustment apparatus according to claim 3, wherein the plurality of predetermined conditions include a condition of reducing a number of second customer terminals participating in the supplementary program.

8. The electric power demand adjustment apparatus according to claim 7, wherein the first customer terminal is first selected from the plurality of customer terminals, and then the second customer terminals are selected from remaining ones of the plurality of customer terminals.

9. The electric power demand adjustment apparatus according to claim 3, wherein the server processor further:
adds a virtual first customer terminal to plurality of customer terminals and re-creates the electric power demand adjustment program.

10. A method of adjusting an electric power demand to improve stability of an electrical power grid, the method comprising:
measuring, by an electric meter that is communicatively coupled to a first customer terminal via a second network, an amount of electricity consumed by a plurality of electric power consuming devices that are communicatively coupled to the first customer terminal via the second network;
acquiring, by a demand response server that is communicatively coupled to the first customer terminal via a first network, customer side information from the first customer terminal, wherein the customer side information includes the amount of electricity consumed by the plurality of electric power consuming devices measured by the electric meter;
extracting, by the demand response server, a plurality of combinations of adjustments to a demand amount allocated between a plurality of customer terminals in each predetermined time segment based on predetermined constraint conditions and the customer side information acquired, wherein the predetermined constraint conditions are stored in a memory of the demand response server;
creating, by the demand response server, a single combination satisfying the predetermined constraint conditions based on the extracted plurality of combinations of adjustments;
wherein the demand response server continues to extract the plurality of combinations of adjustments and creates a plurality of single combinations for a predetermined time segment;
determining, by the demand response server, at an end of the predetermined time segment, a final solution from the plurality of single combinations created, wherein the final solution is determined based on set priorities of each of the plurality of electric power consumer devices;
creating, by the demand response server, an electric power demand adjustment program according to the final solution;
receiving, by the first customer terminal, the electric power demand adjustment program from the demand response server via the first network; and
controlling, by the first customer terminal using the second network, the amount of electricity consumed by the plurality of electric power consuming devices according to the electric power demand adjustment program.

11. The electric power demand adjustment apparatus according to claim 1, wherein the plurality of electric power consuming devices includes at least one of a refrigerator, a freezer, an air conditioner, a lighting device, an electrical motor and an elevator.

12. The method according to claim 10, wherein the plurality of electric power consuming devices includes at least one of a refrigerator, a freezer, an air conditioner, a lighting device, an electrical motor and an elevator.

13. The electric power demand adjustment apparatus according to claim 1, wherein the server processor further:
provides identifying constraint condition information including a constraint condition and at least one of the plurality of customer terminals that have been determined to have no final solution a condition that the server processor fails to create the electric power demand adjustment program.

14. The method according to claim 10, further comprising:
providing, by the demand response server, investigation result information on a condition that the demand response server fails to create the electric power demand adjustment program, wherein the investigation result information indicates a cause of the demand response server failing to create the program.

* * * * *